US012718747B2

(12) United States Patent
Roh et al.

(10) Patent No.: US 12,718,747 B2
**(45) Date of Patent: *Aug. 25, 2026**

(54) DISPLAY PANEL AND DISPLAY DEVICE INCLUDING THE SAME

(71) Applicant: Samsung Display Co., Ltd., Yongin-Si (KR)

(72) Inventors: Jinyoung Roh, Yongin-si (KR); Hae-Kwan Seo, Yongin-si (KR); Bon-Seog Gu, Yongin-si (KR); Jaekeun Lim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/232,748

(22) Filed: Jun. 9, 2025

(65) Prior Publication Data

US 2025/0308440 A1 Oct. 2, 2025

Related U.S. Application Data

(63) Continuation of application No. 18/368,017, filed on Sep. 14, 2023, now Pat. No. 12,327,515.

(30) Foreign Application Priority Data

Dec. 28, 2022 (KR) ........................ 10-2022-0187911

(51) Int. Cl.
*G09G 3/32* (2016.01)

(52) U.S. Cl.
CPC ....... *G09G 3/32* (2013.01); *G09G 2300/0452* (2013.01); *G09G 2310/0267* (2013.01);
(Continued)

(58) Field of Classification Search
CPC ............ G09G 2/32; G09G 2310/0267; G09G 2310/0275; G09G 2310/0297;
(Continued)

(56) References Cited

U.S. PATENT DOCUMENTS

| | | | |
|---|---|---|---|
| 8,004,477 | B2 | 8/2011 | Uchino et al. |
| 9,123,681 | B2 | 9/2015 | Xi et al. |

(Continued)

FOREIGN PATENT DOCUMENTS

| | | | |
|---|---|---|---|
| JP | 5412770 | B2 | 2/2014 |
| KR | 10-2020-0027186 | A | 3/2020 |

(Continued)

*Primary Examiner* — Ricardo Osorio

(74) *Attorney, Agent, or Firm* — Innovation Counsel LLP

(57) ABSTRACT

A display panel includes 11-th to 15-th pixel circuits arranged in a first row, 21-th to 25-th pixel circuits arranged in a second row, 11-th to 14-th light-emitting elements, each being connected to corresponding one of the 11-th to 15-th pixel circuits, and 21-th to 24-th light-emitting elements, each being connected to corresponding one of the 21-th to 25-th pixel circuits. The 11-th light-emitting element is connected to one of the 11-th to 15-th pixel circuits overlapping therewith, wherein the 13-th light-emitting element is connected to one of the 11-th to 15-th pixel circuits non-overlapping therewith via a first connection wiring, wherein the 21-th light-emitting element is connected to one of the 21-th to 25-th pixel circuits overlapping therewith, wherein the 23-th light-emitting element is connected to one of the 21-th to 25-th pixel circuits non-overlapping therewith via a second connection wiring.

19 Claims, 15 Drawing Sheets

(52) U.S. Cl.
CPC ............... *G09G 2310/0275* (2013.01); *G09G 2310/0297* (2013.01); *G09G 2330/021* (2013.01)

(58) Field of Classification Search
CPC ............... G09G 2330/021; G09G 3/32; G09G 2300/0452; G09G 3/3233; G09G 3/3225; G09G 2310/0264
See application file for complete search history.

(56) References Cited

U.S. PATENT DOCUMENTS

| | | | | |
|---|---|---|---|---|
| 10,957,231 | B2 | 3/2021 | Kang | |
| 11,423,821 | B2 | 8/2022 | Oh et al. | |
| 12,327,515 | B2 * | 6/2025 | Roh ..................... | G09G 3/3233 |
| 2011/0025669 | A1 | 2/2011 | Kwak et al. | |
| 2015/0380435 | A1 | 12/2015 | Li et al. | |
| 2022/0115478 | A1 | 4/2022 | Nam et al. | |
| 2022/0406854 | A1 | 12/2022 | Choi et al. | |

FOREIGN PATENT DOCUMENTS

| | | | |
|---|---|---|---|
| KR | 10-2020-0081856 | A | 7/2020 |
| KR | 10-2021-0144402 | A | 11/2021 |
| KR | 10-2022-0048519 | A | 4/2022 |

* cited by examiner

DISPLAY PANEL AND DISPLAY DEVICE INCLUDING THE SAME

CROSS-REFERENCE TO RELATED APPLICATIONS

This application is a continuation application of U.S. patent application Ser. No. 18/368,017 filed on Sep. 14, 2023, which claims priority under 35 U.S.C. § 119 to Korean Patent Application No. 10-2022-0187911 filed on Dec. 28, 2022, in the Korean Intellectual Property Office, the disclosures of which are incorporated by reference herein in their entireties.

BACKGROUND

Embodiments of the present disclosure described herein relate to a display device.

In general, a display device includes a display panel for displaying an image and a driver circuit for driving the display panel. The display panel includes a plurality of scan lines, a plurality of data lines, and a plurality of pixels. The driver circuit includes a data driver circuit that outputs a data signal to the data lines, a scan driver circuit that outputs a scan signal to drive the scan lines, and a drive controller that controls the data driver circuit and the scan driver circuit.

This display device may display an image by outputting the scan signals to scan lines connected to pixels from which the image is to be displayed, and providing data voltages corresponding to the image to data lines connected to the pixels.

Further, each of the plurality of pixels may provide one of various color light such as red light, green light, and blue light. Each of the plurality of pixels may include a light-emitting element and a pixel circuit for driving the light-emitting element. A size of each of the plurality of pixels and an arrangement scheme thereof may vary.

SUMMARY

Embodiments of the present disclosure provide a display panel and display device with reduced power consumption.

A first aspect of the present disclosure provides a display panel including a plurality of data lines which include first to fifth data lines, a plurality of pixel circuits which include 11-th to 15-th pixel circuits respectively connected to the first to fifth data lines and arranged in a first row, and 21-th to 25-th pixel circuits respectively connected to the first to fifth data lines and arranged in a second row, a plurality of light-emitting element which include 11-th to 14-th light-emitting elements, each being connected to corresponding one of the 11-th to 15-th pixel circuits, and 21-th to 24-th light-emitting elements, each being connected to corresponding one of the 21-th to 25-th pixel circuits, wherein the 11-th light-emitting element is connected to one of the 11-th to 15-th pixel circuits which overlaps the 11-th light-emitting element, wherein the 13-th light-emitting element is connected to one of the 11-th to 15-th pixel circuits which does not overlap the 13-th light-emitting element via a first connection wiring, wherein the 21-th light-emitting element is connected to one of the 21-th to 25-th pixel circuits which overlaps the 21-th light-emitting element, wherein the 23-th light-emitting element is connected to one of the 21-th to 25-th pixel circuits which does not overlap the 23-th light-emitting element via a second connection wiring, wherein the 11-th light-emitting element and the 23-th light-emitting element emit light of the same color, wherein the 13-th light-emitting element and the 21-th light-emitting element emit light of the same color, wherein the 13-th light-emitting element and the 23-th light-emitting element emit light of different colors, respectively.

In one embodiment, the 11-th to 14-th light-emitting elements may be sequentially arranged in a first direction, wherein the 21-th to 24-th light-emitting elements may be sequentially arranged in the first direction.

In one embodiment, the display panel may further include a demultiplexer configured to operate in response to a switching signal to alternately connect a first output line to the first data line and the second data line, configured to alternately connect a second output line to the third data line and the fourth data line, and configured to connect a third output line to the fifth data line.

In one embodiment, each of the 11-th light-emitting element and the 23-th light-emitting element may emit first color light, wherein each of the 12-th light-emitting element, the 14-th light-emitting element, the 22-th light-emitting element, and the 24-th light-emitting element may emit second color light, wherein each of the 13-th light-emitting element and the 21-th light-emitting element may emit third color light.

In one embodiment, the first output line may alternately transmit a data signal corresponding to the first color light and a data signal corresponding to the third color light, wherein the second output line may transmit a data signal corresponding to the second color light, wherein the third output line may transmit a data signal corresponding to the first color light.

In one embodiment, the first data line may transmit the data signal corresponding to the first color light, wherein the second data line may transmit the data signal corresponding to the third color light, wherein each of the third data line and the fourth data line may transmit the data signal corresponding to the second color light, wherein the fifth data line may transmit the data signal corresponding to the first color light.

In one embodiment, the first connection wiring may intersect the second data line and the third data line to overlap the second data line and the third data line, and wherein the second connection wiring may intersect the fourth data line and the fifth data line to overlap the fourth data line and the fifth data line.

In one embodiment, the first connection wiring may intersect the fourth data line and the fifth data line to overlap the fourth data line and the fifth data line, wherein the second connection wiring may intersect the second data line and the third data line to overlap the second data line and the third data line.

In one embodiment, each of the plurality of light-emitting elements may include an anode and a cathode, wherein the first connection wiring may extend from the anode of the 13-th light-emitting element, wherein the second connection wiring may extend from the anode of the 23-th light-emitting element.

In one embodiment, each of the 11-th light-emitting element and the 23-th light-emitting element may emit blue color light, wherein each of the 12-th light-emitting element, the 14-th light-emitting element, the 22-th light-emitting element, and the 24-th light-emitting element may emit green color light, wherein each of the 13-th light-emitting element and the 21-th light-emitting element may emit red color light.

In one embodiment, each of the 11-th light-emitting element and the 23-th light-emitting element may emit red color light, wherein each of the 12-th light-emitting element, the 14-th light-emitting element, the 22-th light-emitting element, and the 24-th light-emitting element may emit green color light, wherein each of the 13-th light-emitting element and the 21-th light-emitting element may emit blue color light.

In one embodiment, the 12-th light-emitting element may be connected to the 13-th pixel circuit via a third connection wiring, wherein the 14-th light-emitting element may be connected to the 14-th pixel circuit, wherein the 22-th light-emitting element may be connected to the 23-th pixel circuit via a fourth connection wiring, wherein the 24-th light-emitting element may be connected to the 24-th pixel circuit.

In one embodiment, the display panel may further include a demultiplexer including a first switch and a second switch, the demultiplexer being configured to operate in response to the first switching signal applied to the first switch to connect first, second, and third output lines to the first, third, and fifth data lines, respectively, and operate in response to the second switching signal applied to the second switch to connect the first and second output lines to the second and fourth data lines, respectively, wherein, during a first frame, the first switching signal transitions to an active level before the second switching signal transitions to an active level, wherein, during a second frame subsequent to the first frame, the second switching signal transitions to an active level before the first switching signal transitions to an active level.

In one embodiment, some of the 11-th to 15-th pixel circuits in the first row may be connected to a first scan line and others of the 11-th to 15-th pixel circuits in the first row may be connected to a second scan line, wherein some of the 21-th to 25-th pixel circuits in the second row may be connected to a third scan line and others of the 21-th to 25-th pixel circuits in the second row may be connected to a fourth scan line.

In one embodiment, an activation period of each of scan signals respectively transmitted to the first to fourth scan lines may be longer than a half of one horizontal period.

A second aspect of the present disclosure provides a display device including a display panel, a data driver circuit electrically connected to a first output line, a second output line, and a third output line, and a demultiplexer configured to alternately electrically connect the first output line to a first data line and a second data line, alternately electrically connect the second output line to a third data line and a fourth data line, and electrically connect the third output line to a fifth data line, wherein the display panel includes a plurality of pixel circuits which include 11-th to 15-th pixel circuits respectively connected to the first to fifth data lines and arranged in a first row, and 21-th to 25-th pixel circuits respectively connected to the first to fifth data lines and arranged in a second row, and a plurality of light-emitting elements which include 11-th to 14-th light-emitting elements, each being connected to corresponding one of the 11-th to 15-th pixel circuits, and 21-th to 24-th light-emitting elements, each being connected to corresponding one of the 21-th to 25-th pixel circuits, wherein the 11-th light-emitting element is connected to one of the 11-th to 15-th pixel circuits which overlaps the 11-th light-emitting element, wherein the 13-th light-emitting element is connected to one of the 11-th to 15-th pixel circuits which does not overlap the 13-th light-emitting element via a first connection wiring, wherein the 21-th light-emitting element is connected to one of the 21-th to 25-th pixel circuits which overlaps the 21-th light-emitting element, wherein the 23-th light-emitting element is connected to one of the 21-th to 25-th pixel circuits which does not overlap the 23-th light-emitting element via a second connection wiring, wherein the 11-th light-emitting element and the 23-th light-emitting element emit light of the same color, wherein the 13-th light-emitting element and the 21-th light-emitting element emit light of the same color, wherein the 13-th light-emitting element and the 23-th light-emitting element respectively emit light of different colors.

In one embodiment, the demultiplexer may be configured to operate in response to a switching signal to alternately electrically connect the first output line to the first data line and the second data line, and to alternately electrically connect the second output line to the third data line and the fourth data line, and to electrically connect the third output line to the fifth data line.

In one embodiment, the 11-th to 14-th light-emitting elements may be sequentially arranged in a first direction, wherein the 21-th to 24-th light-emitting elements may be sequentially arranged in the first direction.

In one embodiment, each of the 11-th light-emitting element and the 23-th light-emitting element may emit first color light, wherein each of the 12-th light-emitting element, the 14-th light-emitting element, the 22-th light-emitting element, and the 24-th light-emitting element may emit second color light, wherein each of the 13-th light-emitting element and the 21-th light-emitting element may emit third color light.

In one embodiment, the data driver circuit may be configured to alternately output a data signal corresponding to the first color light and a data signal corresponding to the third color light to the first output line, output a data signal corresponding to the second color light to the second output line, and output a data signal corresponding to the first color light to the third output line.

In one embodiment, the first data line may transmit the data signal corresponding to the first color light, wherein the second data line may transmit the data signal corresponding to the third color light, wherein each of the third data line and the fourth data line may transmit the data signal corresponding to the second color light, wherein the fifth data line may transmit the data signal corresponding to the first color light.

In one embodiment, the first connection wiring may intersect the second data line and the third data line to overlap the second data line and the third data line, wherein the second connection wiring may intersect the fourth data line and the fifth data line to overlap the fourth data line and the fifth data line.

In one embodiment, the plurality of light-emitting elements may include an anode and a cathode, wherein the first connection wiring may extend from the anode of the 13-th light-emitting element, wherein the second connection wiring may extend from the anode of the 23-th light-emitting element.

A third aspect of the present disclosure provides a display panel including a plurality of pixel circuits which include first and second output lines, a first pixel circuit and a second pixel circuit electrically connected to the first output line, a third pixel circuit and a fourth pixel circuit electrically connected to the second output line and first to fourth light-emitting elements respectively connected to the first to fourth pixel circuits, wherein a light-emitting element overlapping at least one of the third pixel circuit and the fourth pixel circuit among the first to fourth light-emitting elements is electrically insulated from the third pixel circuit and the fourth pixel circuit, wherein, during a first period, a first data signal of the first output line is provided to the first pixel circuit, and a second data signal of the second output line is provided to the third pixel circuit, wherein, during a second period, a third data signal of the first output line is provided to the second pixel circuit, and a fourth data signal of the second output line is provided to the fourth pixel circuit, wherein the second data signal and the fourth data signal have the same color.

In one embodiment, the first data signal, the second data signal, and the third data signal may have different colors.

In one embodiment, the first pixel circuit may be electrically connected to the first light-emitting element, wherein the second pixel circuit may be electrically connected to the third light-emitting element, wherein the third pixel circuit may be electrically connected to the second light-emitting element, wherein the fourth pixel circuit may be electrically connected to the fourth light-emitting element.

In one embodiment, the second light-emitting element and the fourth light-emitting element may emit light of the same color.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
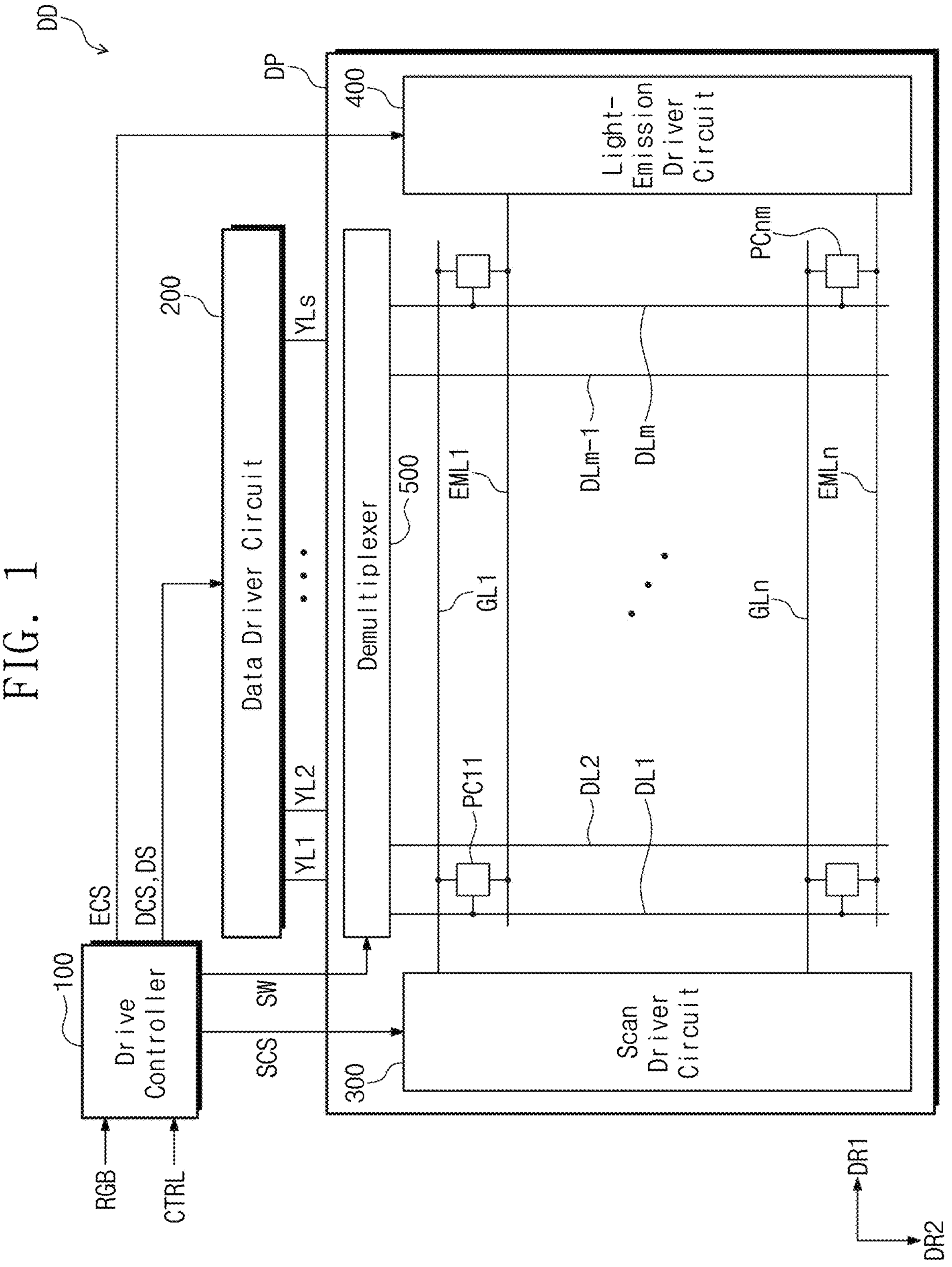
FIG. 1 is a block diagram of a display device according to an embodiment of the present disclosure.

As used herein, when a component or a region, a layer, a portion, etc. is referred to as being "on", "connected to", or "coupled to" another component, it means that the component may be directly disposed/connected/coupled on another component or a third component may be disposed between the component and another component.

Like reference numerals refer to like components. In addition, in the drawings, thicknesses, ratios, and dimensions of components are exaggerated for effective description of technical content. "and/or" includes all of one or more combinations that the associated components may define.

Terms such as first, second, etc. may be used to describe various components, but the components should not be limited by the terms. The above terms are used only for the purpose of distinguishing one component from another. For example, without departing from the scope of the present disclosure, a first component may be named as a second component, and similarly, the second component may also be named as the first component. The singular expression includes the plural expression unless the context clearly dictates otherwise.

In addition, terms such as "beneath", "below", "on", "above" are used to describe the relationship of the components illustrated in the drawings. The above terms are relative concepts, and are described with reference to directions indicated in the drawings.

It should be understood that terms such as "include" or "have" are intended to specify that a feature, a number, a step, an operation, a component, a part, or a combination thereof described in the specification is present, and do not preclude a possibility of addition or existence of one or more other features or numbers, steps, operations, components, parts, or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to drawings.

FIG. 1 is a block diagram of a display device DD according to an embodiment of the present disclosure.

Referring to FIG. 1, the display device DD includes a drive controller 100, a data driver circuit 200, and a display panel DP.

The drive controller 100 receives an input image signal RGB and a control signal CTRL. The drive controller 100 generates an output image signal DS by converting the input image signal RGB into an image type suitable for the display panel DP. The drive controller 100 outputs a switching signal SW, a scan control signal SCS and a data control signal DCS.

The display panel DP according to an embodiment of the present disclosure may be a light-emitting display panel. For example, the display panel DP may be an organic light-emitting display panel, an inorganic light-emitting display panel, or a quantum dot light-emitting display panel. A light-emitting layer of the organic light-emitting display panel may include an organic light-emitting material. A light-emitting layer of the inorganic light-emitting display panel may include an inorganic light-emitting material. A light-emitting layer of the quantum dot light-emitting display panel may include a quantum dot, a quantum rod, or the like. Hereinafter, in this embodiment, an example in which the display panel DP is embodied as the organic light-emitting display panel is described.

The display panel DP includes scan lines GL1 to GLn, data lines DL1 to DLm, and pixel circuits PC11 to PCnm. Although not shown in FIG. 1, the display panel DP may include a plurality of light-emitting elements. The plurality of light-emitting elements will be described in detail later.

The display panel DP may further include a scan driver circuit 300, a light-emission driver circuit 400 and a demultiplexer 500. Each of the pixel circuits PC11 to PCnm may be electrically connected to the scan driver circuit 300, the light-emission driver circuit 400, and the demultiplexer 500.

The scan lines GL1 to GLn extend from the scan driver circuit 300 in a first direction DR1 and are spaced apart from each other in a second direction DR2. The light-emission control lines EML1 to EMLn extend from the light-emission driver circuit 400 in a direction opposite to the first direction DR1 and are spaced apart from each other in the second direction DR2. The data lines DL1 to DLm extend from the demultiplexer 500 in the second direction DR2 and are spaced apart from each other in the first direction DR1.

Each of the pixel circuits PC11 to PCnm may be connected to a corresponding scan line among the scan lines GL1 to GLn (n is a positive integer), and may be connected to a corresponding data line among the data lines DL1 to DLm (m is a positive integer), and may be connected to a corresponding light-emission control line among light-emission control lines EML1 to EMLn. FIG. 1 shows that each of the plurality of pixel circuits PC11 to PCnm is connected to one scan line. However, the present disclosure is not limited thereto. Each of the plurality of pixel circuits PC11 to PCnm may be electrically connected to two or more scan lines.

The data driver circuit 200 receives the data control signal DCS and the output image signal DS from the drive controller 100. The data driver circuit 200 converts the output image signal DS into data signals, and outputs the data signals to output lines YL1 to YLs (s is a positive integer). Each of the data signals may have a voltage level corresponding to a grayscale level of the output image signal DS. In an embodiment, the number of output lines YL1 to YLs may be smaller than the number of data lines DL1 to DLm (that is, s<m).

The data driver circuit 200 may be implemented as an integrated circuit (IC) and may be directly mounted on a predetermined area of the display panel DP. Alternatively, the data driver circuit 200 may be mounted on a separate printed circuit board in a chip on film (COF) scheme and then may be electrically connected to the display panel DP. In another embodiment, the data driver circuit 200 may be formed on the display panel DP in the same process as a process forming the pixel circuits PC11 to PCnm.

The scan driver circuit 300 receives the scan control signal SCS from the drive controller 100. The scan driver circuit 300 may output the scan signals to the scan lines GL1 to GLn in response to the scan control signal SCS. In an embodiment, the scan driver circuit 300 may be formed in the same process as a process forming the pixel circuits PC11 to PCnm.

The light-emission driver circuit 400 receives a light-emission drive signal ECS from the drive controller 100. The light-emission driver circuit 400 may output the light-emission control signals to the light-emission control lines EML1 to EMLn in response to the light-emission drive signal ECS. In an embodiment, the light-emission driver circuit 400 may be formed in the same process as a process forming the pixel circuits PC11 to PCnm. FIG. 1 shows the light-emission driver circuit 400. However, the present disclosure is not limited thereto. In an embodiment, the light-emission driver circuit 400 may be embedded in the scan driver circuit 300.

The drive controller 100, the data driver circuit 200, the scan driver circuit 300, and the light-emission driver circuit 400 may be a driver circuit to provide the data signal corresponding to the input image signal RGB to the pixel circuits PC11 to PCnm.

The demultiplexer 500 may electrically connect the plurality of output lines YL1 to YLs to the data lines DL1 to DLm in response to the switching signal SW provided from the drive controller 100. A specific circuit configuration and operation of the demultiplexer 500 will be described in detail later.

FIG. 1 shows that the demultiplexer 500 is disposed in the display panel DP. However, the present disclosure is not limited thereto. In an embodiment, the demultiplexer 500 may be included in the data driver circuit 200. In an embodiment, the demultiplexer 500 may be provided in a separate driver circuit or circuit board independent from the display panel DP and the data driver circuit 200.

Figure 2:
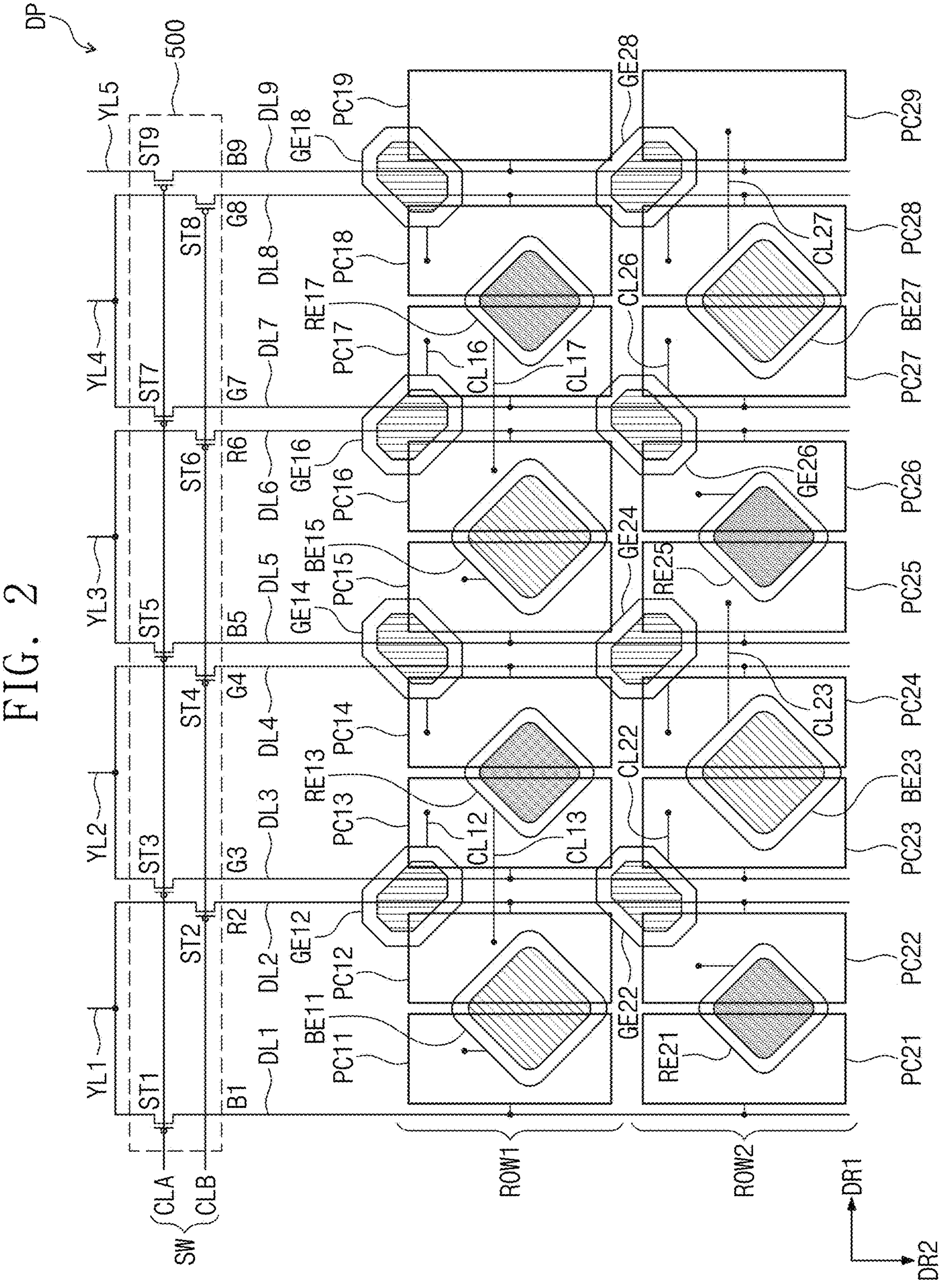
FIG. 2 is a diagram showing pixel circuits and light-emitting elements disposed in a display panel by way of example.

FIG. 2 is a diagram showing the pixel circuits and the light-emitting elements disposed in the display panel DP according to an embodiment of the present disclosure.

Referring to FIG. 2, the display panel DP includes the demultiplexer 500, data lines DL1 to DL9, the first-row pixel circuits PC11 to PC19, the second-row pixel circuits PC21 to PC29, first light-emitting elements BE11, BE15, BE23 and BE27, second light-emitting elements GE12, GE14, GE16, GE18, GE22, GE24, GE26, and GE28, and third light-emitting elements RE13, RE17, RE21, and RE25. Sizes and arrangements of the first-row pixel circuits PC11 to PC19, the second-row pixel circuits PC21 to PC29, the first light-emitting elements BE11, BE15, BE23 and BE27, the second light-emitting elements GE12, GE14, GE16, GE18, GE22, GE24, GE26, and GE28, and the third light-emitting elements RE13, RE17, RE21, and RE25 as shown in FIG. 2 are only examples to help understand the description. The present disclosure is not limited thereto.

In one embodiment, the first-row pixel circuits PC11 to PC19 may be referred to as 11-th to 19-th pixel circuits, respectively. The second-row pixel circuits PC21 to PC29 may be referred to as 21-th to 29-th pixel circuits, respectively.

Although not shown in the drawing, in one embodiment, each of the first-row pixel circuits PC11 to PC19 may be connected to a same scan line. In one embodiment, each of the second-row pixel circuits PC21 to PC29 may be connected to a same scan line.

The light-emitting elements may be referred to as the first light-emitting element, the second light-emitting element, and the third light-emitting element based on a color of light emitted therefrom. In one embodiment, the first light-emitting element BE11, the second light-emitting element GE12, the third light-emitting element RE13, the second light-emitting element GE14, the first light-emitting element BE15, the second light-emitting element GE16, the third light-emitting element RE17, and the second light-emitting element GE18 may be referred to as 11-th to 18-th light-emitting elements BE11 to GE18 in an order in which they are arranged in the first direction DR1. Further, the third light-emitting element RE21, the second light-emitting element GE22, the first light-emitting element BE23, the second light-emitting element GE24, the third light-emitting element RE25, the second light-emitting element GE26, the first light-emitting element BE27, and the second light-emitting element GE28 may be referred to as 21-th to 28-th light-emitting elements RE21 to GE28 in an order in which they are arranged in the first direction DR1.

The first light-emitting element BE11, the second light-emitting element GE12, the second light-emitting element GE22 and the third light-emitting element RE21 may be referred to as a first light-emitting area, a second light-emitting area, a third light-emitting area, and a fourth light-emitting area, respectively.

The demultiplexer 500 includes first switching transistors ST1, ST3, ST5, ST7 and ST9 and second switching transistors ST2, ST4, ST6 and ST8.

The first switching transistor ST1 is disposed between and connected to the output line YL1 and the data line DL1. The first switching transistor ST3 is disposed between and connected to the output line YL2 and the data line DL3. The first switching transistor ST5 is disposed between and connected to the output line YL3 and the data line DL5. The first switching transistor ST7 is disposed between and connected to the output line YL4 and the data line DL7. The first switching transistor ST9 is disposed between and connected to the output line YL5 and the data line DL9. In an embodiment, the demultiplexer 500 may not include the first switching transistor ST9. In this case, the output line YL5 may be directly connected to the data line DL9.

The second switching transistor ST2 is disposed between and connected to the output line YL1 and the data line DL2. The second switching transistor ST4 is disposed between and connected to the output line YL2 and the data line DL4. The second switching transistor ST6 is disposed between and connected to the output line YL3 and the data line DL6. The second switching transistor ST8 is disposed between and connected to the output line YLA and the data line DL8.

The first switching transistors ST1, ST3, ST5, ST7 and ST9 are turned on in response to a first switching signal CLA, and the second switching transistors ST2, ST4, ST6 and ST8 are turned on in response to a second switching signal CLB. The switching signal SW provided from the drive controller 100 as shown in FIG. 1 may include the first switching signal CLA and the second switching signal CLB. The first-row pixel circuits PC11 to PC19 may be sequentially arranged in a first row ROW1 in the first direction DR1. The second-row pixel circuits PC21 to PC29 may be sequentially arranged in a second row ROW2 in the first direction DR1.

The data lines DL2 to DL9 may be disposed adjacent to each other on two data lines basis. That is, the data lines DL2 and DL3 are disposed adjacent to each other between the first-row pixel circuits PC12 and PC13. The data lines DL4 and DL5 are disposed adjacent to each other and between the first-row pixel circuits PC14 and PC15. The data lines DL6 and DL7 are disposed adjacent to each other between the first-row pixel circuits PC16 and PC17. The data lines DL8 and DL9 are disposed adjacent to each other between the first-row pixel circuits PC18 and PC19. The first-row pixel circuits PC11 to PC19 and the second-row pixel circuits PC21 to PC29 are respectively connected to corresponding data lines among the data lines DL1 to DL9.

In an embodiment, some of the first-row pixel circuits PC11 to PC19 and the second-row pixel circuits PC21 to PC29 may be respectively connected to corresponding right data lines of the data lines DL1 to DL9, while the others thereof may be respectively connected to corresponding left data lines of the data lines DL1 to DL9.

In an embodiment, the first-row pixel circuits PC12, PC14, PC16 and PC18, and the second-row pixel circuits PC22, PC24, PC26 and PC28 are connected to the data lines DL2, DL4, DL6 and DL8 adjacent thereto in a right direction, respectively. In an embodiment, the first-row pixel circuits PC11, PC13, PC15, PC17, and PC19, and the second-row pixel circuits PC21, PC23, PC25, PC27 and PC29 are connected to the data lines DL1, DL3, DL5, DL7 and DL9 adjacent thereto in a left direction, respectively.

The first light-emitting elements BE11 and BE15, the second light-emitting elements GE12, GE14, GE16 and GE18, and the third light-emitting elements RE13 and RE17 are arranged in the first row ROW1.

In the first row ROW1, the first light-emitting element BE11, the second light-emitting element GE12, the third light-emitting element RE13, the second light-emitting element GE14, the first light-emitting element BE15, the second light-emitting element GE16, the third light-emitting element RE17, and the second light-emitting element GE18 may be sequentially arranged in the first direction DR1.

In the second row ROW2, the third light-emitting element RE21, the second light-emitting element GE22, the first light-emitting element BE23, the second light-emitting element GE24, the third light-emitting element RE25, the second light-emitting element GE26, the first light-emitting element BE27, and the second light-emitting element GE28 be sequentially arranged in the first direction DR1.

In one embodiment, each of the first light-emitting elements BE11, BE15, BE23, and BE27 may emit first color light, and each of the second light-emitting elements GE12, GE14, GE16, GE18, GE22, GE24, GE26, and GE28 may emit second color light, and each of the third light-emitting elements RE13, RE17, RE21, and RE25 may emit third color light.

In one embodiment, the first to third color light may be different color light.

In one embodiment, the first to third color light may be blue light, green light, and red light, respectively. However, the present disclosure is not limited thereto. In another embodiment, each of the first to third color light may be various color light such as blue light, green light, red light, white light, cyan light, magenta light, and yellow light.

The first light-emitting elements BE11 and BE15 of the first row ROW1 are electrically connected to the first-row pixel circuits PC11 and PC15, respectively. The second light-emitting elements GE14 and GE18 of the first row ROW1 are electrically connected to the first-row pixel circuits PC14 and PC18, respectively.

The second light-emitting elements GE12 and GE16 of the first row ROW1 are electrically connected to the first-row pixel circuits PC13 and PC17 via connection wirings CL12 and CL16, respectively. The third light-emitting elements RE13 and RE17 of the first row ROW1 are electrically connected to the first-row pixel circuits PC12 and PC16 via connection wirings CL13 and CL17, respectively.

The third light-emitting elements RE21 and RE25 of the second row ROW2 are electrically connected to the second-row pixel circuits PC22 and PC26, respectively. The second light-emitting elements GE22 and GE26 of the second row ROW2 are electrically connected to the second-row pixel circuits PC23 and PC27 via connection wirings CL22 and CL26, respectively.

The first light-emitting elements BE23 and BE27 of the second row ROW2 are electrically connected to the second-row pixel circuits PC25 and PC29 via connection wirings CL23 and CL27, respectively. The second light-emitting elements GE24 and GE28 of the second row ROW2 are electrically connected to the second-row pixel circuits PC24 and PC28, respectively.

The first-row pixel circuit PC11 connected to the data line DL1 is connected to the first light-emitting element BE11. In the example as shown in FIG. 2, no light-emitting element is connected to the second-row pixel circuit PC21 connected to the data line DL1. In another embodiment, the display panel DP may not include the second-row pixel circuit PC21 connected to the data line DL1.

The first-row pixel circuit PC12 and the second-row pixel circuit PC22 connected to the data line DL2 are connected to the third light-emitting elements RE13 and RE21, respectively.

The first-row pixel circuit PC13 and the second-row pixel circuit PC23 connected to the data line DL3 are connected to the second light-emitting elements GE12 and GE22, respectively.

The first-row pixel circuit PC14 and the second-row pixel circuit PC24 connected to the data line DLA are connected to the second light-emitting elements GE14 and GE24, respectively.

The first-row pixel circuit PC15 and the second-row pixel circuit PC25 connected to the data line DL5 are connected to the first light-emitting elements BE15 and BE23, respectively.

The first-row pixel circuit PC16 and the second-row pixel circuit PC26 connected to the data line DL6 are connected to the third light-emitting elements RE17 and RE25, respectively.

The first-row pixel circuit PC17 and the second-row pixel circuit PC27 connected to the data line DL7 are connected to the second light-emitting elements GE16 and GE26, respectively.

The first-row pixel circuit PC18 and the second-row pixel circuit PC28 connected to the data line DL8 are connected to the second light-emitting elements GE18 and GE28, respectively.

The second-row pixel circuit PC29 connected to the data line DL9 is connected to the first light-emitting element BE27. In the example as shown in FIG. 2, no light-emitting element is connected to the first-row pixel circuit PC19 connected to the data line DL9. In another embodiment, the display panel DP may not include the first-row pixel circuit PC19 connected to the data line DL9.

As shown in FIG. 2, each of the data lines DL1 to DL9 is connected to the light-emitting element(s) emitting the same color light. Therefore, data signals of one color may be provided to each of the data lines DL1 to DL9.

In particular, data signals G3 and G4 corresponding to the second color light are provided to the data lines DL3 and DL4 via the output line YL2 and the first and second switching transistors ST3 and ST4, respectively. Further, data signals G7 and G8 corresponding to the second color light are provided to the data lines DL7 and DL8 via the output line YL4 and the first and second switching transistors ST7 and ST8, respectively.

The data signals provided to the data lines DL3, DL4, DL7, and DL8 from the data driver circuit 200 via the output lines YL2 and YL4 from the data driver circuit 200 may be the data signals G3, G4, G7, and G8 corresponding to the same color such that power consumption of the data driver circuit 200 may be reduced.

Figure 3:
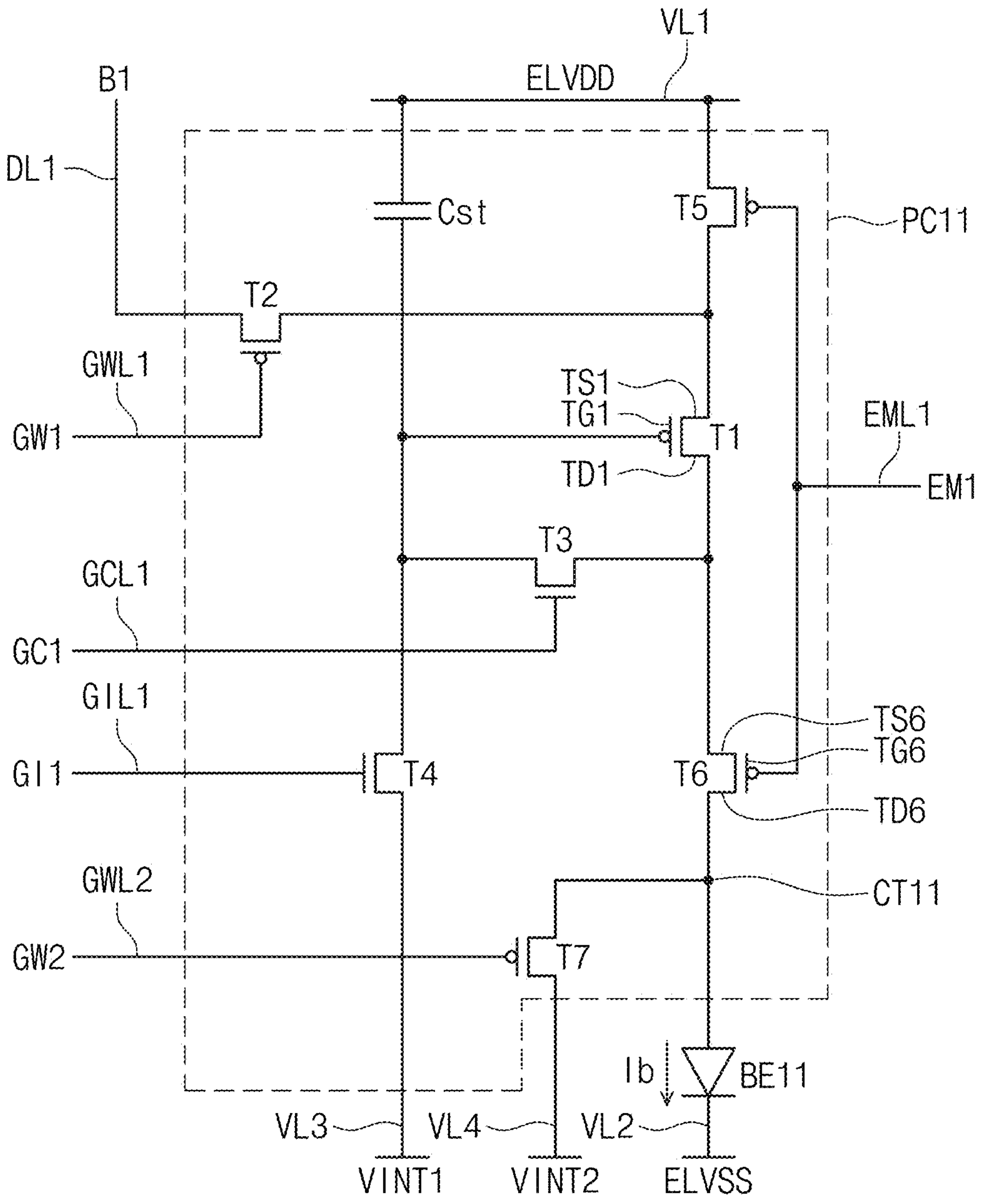
FIG. 3 is a circuit diagram of a first-row pixel circuit and a second light-emitting element according to an embodiment of the present disclosure.

FIG. 3 is a circuit diagram of the first-row pixel circuit PC11 and the first light-emitting element BE11 according to an embodiment of the present disclosure.

FIG. 3 shows the first-row pixel circuit PC11 and the first light-emitting element BE11 by way of example. In an embodiment, the first light-emitting element BE11 may be a light-emitting diode. The first light-emitting element BE11 may emit the first color light (e.g., blue light).

In an embodiment, the first-row pixel circuit PC11 may include at least one transistor and at least one capacitor. The first-row pixel circuit PC11 as shown in FIG. 3 includes first to seventh transistors T1, T2, T3, T4, T5, T6, and T7 and a capacitor Cst. A configuration of the pixel circuit PC11 as shown in FIG. 3 is only an example, and the configuration of the first-row pixel circuit PC11 may be implemented in a modified manner.

In this embodiment, each of the third and fourth transistors T3 and T4 among the first to seventh transistors T1 to T7 may be an N-type transistor using an oxide semiconductor as a semiconductor layer. Each of the first, second, fifth, sixth, and seventh transistors T1, T2, T5, T6, and T7 may be a P-type transistor having a low-temperature polycrystalline silicon (LTPS) semiconductor layer. However, the present disclosure is not limited thereto. In an embodiment, all of the first to seventh transistors T1 to T7 may be P-type transistors or N-type transistors. In another embodiment, at least one of the first to seventh transistors T1 to T7 may be an N-type transistor and the others thereof may be P-type transistors.

In an embodiment, the first-row pixel circuit PC11 may be electrically connected to one data line DL1, four scan lines GIL1, GCL1, GWL1, and GWL2 and one light-emission control line EML1. Each of the scan lines GL1 to GLn as shown in FIG. 1 may include a plurality of scan lines. In an embodiment, the scan line GL1 as shown in FIG. 1 may include four scan lines GIL1, GCL1, GWL1, and GWL2.

The scan lines GIL1, GCL1, GWL1, and GWL2 may transmit scan signals GI1, GC1, GW1, and GW2, respectively. The light-emission control line EML1 may transmit a light-emission control signal EM1. The data line DL1 carries a data signal B1. The data signal B1 may have a voltage level corresponding to the image signal RGB input to the display device DD (see FIG. 1). First to fourth drive voltage lines VL1, VL2, VL3, and VL4 may transmit a first drive voltage ELVDD, a second drive voltage ELVSS, a first initialization voltage VINT1 and a second initialization voltage VINT2, respectively.

The first transistor T1 includes a first electrode TS1 connected to the first drive voltage line VL1 via the fifth transistor T5, a second electrode TD1, and a gate electrode TG1 connected to one end of the capacitor Cst.

The second transistor T2 includes a first electrode connected to the data line DL1, a second electrode connected to the first electrode TS1 of the first transistor T1, and a gate electrode connected to the scan line GWL1. The second transistor T2 may be turned on in response to the scan signal GW1 received via the scan line GWL1 to transmit the data signal B1 transmitted from the data line DL1 to the first electrode TS1 of the first transistor T1. The data signal B1 transmitted from the data line DL1 may correspond to the first color.

The third transistor T3 includes a first electrode connected to the gate electrode TG1 of the first transistor T1, a second electrode connected to the second electrode TD1 of the first transistor T1, and a gate electrode connected to the scan line GCL1. The third transistor T3 may be turned on in response to the scan signal GC1 received through the scan line GCL1 to connect the gate electrode TG1 of the first transistor T1 to the second electrode of the first transistor T1 such that the first transistor T1 may be connected in a diode manner.

The fourth transistor T4 includes a first electrode connected to the gate electrode TG1 of the first transistor T1, a second electrode connected to the third drive voltage line VL3 to which the first initialization voltage VINT1 is transmitted, and a gate electrode connected to the scan line GIL1. The fourth transistor T4 may be turned on in response to the scan signal GI1 received via the scan line GIL1 to transfer the first initialization voltage VINT1 to the gate electrode TG1 of the first transistor T1 to initialize a voltage of the gate electrode TG1 of the first transistor T1.

The fifth transistor T5 includes a first electrode connected to the first drive voltage line VL1, a second electrode connected to the first electrode TS1 of the first transistor T1, and a gate electrode connected to the light-emission control line EML1.

The sixth transistor T6 includes a first electrode TS6 connected to the second electrode TD1 of the first transistor T1, a second electrode TD6 connected to an anode of the first light-emitting element BE11, and a gate electrode TG6 connected to the light-emission control line EML1. The second electrode TD6 of the sixth transistor T6 and the anode of the first light-emitting element BE11 may be connected to each other via a connection node CT11.

The fifth transistor T5 and the sixth transistor T6 may be simultaneously turned on in response to the light-emission control signal EM1 transmitted via the light-emission control line EML1. As the fifth transistor T5 and the sixth transistor T6 are turned on, a current path from the first drive voltage line VL1 to the first light-emitting element BE11 via the fifth transistor T5, the first transistor T1, and the sixth transistor T6 may be formed. In this regard, current flowing through the first transistor T1 may correspond to charges stored in the capacitor Cst. Therefore, current Ib corresponding to a data signal B1 may be transferred to the first light-emitting element BE11. In other words, the data signal B1 may be converted into the current Ib via the first-row pixel circuit PC11 and then, the current Ib may be provided to the first light-emitting element BE11.

The seventh transistor T7 includes a first electrode connected to the second electrode of the sixth transistor T6, a second electrode connected to the fourth drive voltage line VL4, and a gate electrode connected to the scan line GWL2. The seventh transistor T7 may be turned on in response to the scan signal GW2 received via the scan line GWL2 to initialize the anode of the first light-emitting element BE11 based on the second initialization voltage VINT2 supplied from the fourth drive voltage line VL4.

As described above, one end of the capacitor Cst is connected to the gate electrode TG1 of the first transistor T1, and the other end thereof is connected to the first drive voltage line VL1. A cathode of the first light-emitting element BE11 may be connected to the second drive voltage line VL2 transmitting the second drive voltage ELVSS.

Like the first-row pixel circuit PC11 as shown in FIG. 3, each of the first-row pixel circuits PC14, PC15, and PC18 and the second-row pixel circuits PC22, PC24, PC26, and PC28 as shown in FIG. 2 may be electrically connected to a light-emitting element disposed adjacent thereto (or partially overlapping therewith).

Figure 4:
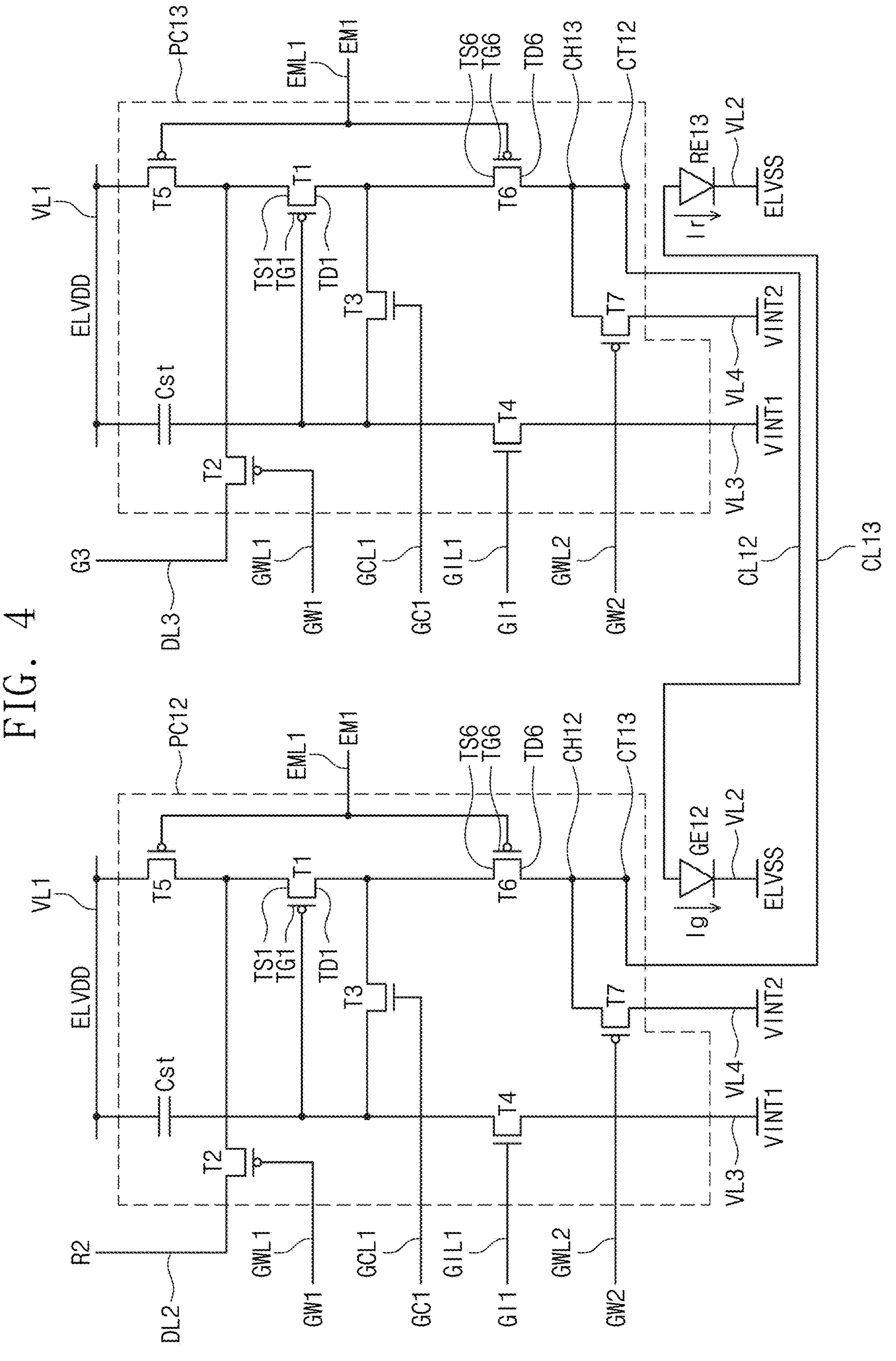
FIG. 4 is a circuit diagram of a first-row pixel circuit, a second light-emitting element, a pixel circuit, and a first light-emitting element according to an embodiment of the present disclosure.

FIG. 4 shows a circuit diagram of the first-row pixel circuit PC12, the second light-emitting element GE12, the first-row pixel circuit PC13, and the third light-emitting element RE13 according to an embodiment of the present disclosure.

Each of the first-row pixel circuit PC12 and the first-row pixel circuit PC13 as shown in FIG. 4 may include a circuit configuration similar to that of the pixel circuit PC11 as shown in FIG. 3. A component of each of the first-row pixel circuit PC12 and the first-row pixel circuit PC13 as shown in FIG. 4 identical with that of the first-row pixel circuit PC11 in FIG. 3 may have the same reference numeral. Redundant description thereof is omitted.

Referring to FIG. 2 and FIG. 4, the second light-emitting element GE12 disposed adjacent to (or partially overlapping) the first-row pixel circuit PC12 may be a light-emitting element that emits light of the second color light (for example, green light). In an embodiment, the first-row pixel circuit PC12 and the second light-emitting element GE12 are electrically insulated from each other.

The third light-emitting element RE13 disposed adjacent to (or partially overlapping) the first-row pixel circuit PC13 may be a light-emitting element emitting the third color light (e.g., red light). In an embodiment, the first-row pixel circuit PC13 and the third light-emitting element RE13 are electrically insulated from each other.

In one embodiment, the first-row pixel circuit PC12 is electrically connected to the third light-emitting element RE13 via a connection portion CH12, a connection node CT13, and the connection wiring CL13. Therefore, a data signal R2 transmitted via the data line DL2 may be converted into current Ir via the first-row pixel circuit PC12 and then, the current Ir may be provided to the third light-emitting element RE13.

In one embodiment, the first-row pixel circuit PC13 is electrically connected to the second light-emitting element GE12 via a connection portion CH13, a connection node CT12 and the connection wiring CL12. Therefore, the data signal G3 transmitted via the data line DL3 may be converted into current Ig via the first-row pixel circuit PC13 and then, the current Ig may be provided to the second light-emitting element GE12.

Like the first-row pixel circuit PC12 as shown in FIG. 4, each of the first-row pixel circuits PC16 and PC17 and the second-row pixel circuits PC23, PC25, PC27, and PC29 as shown in FIG. 2 may be electrically connected to the light-emitting element spaced apart therefrom (or non-overlapping therewith).

Figure 5:
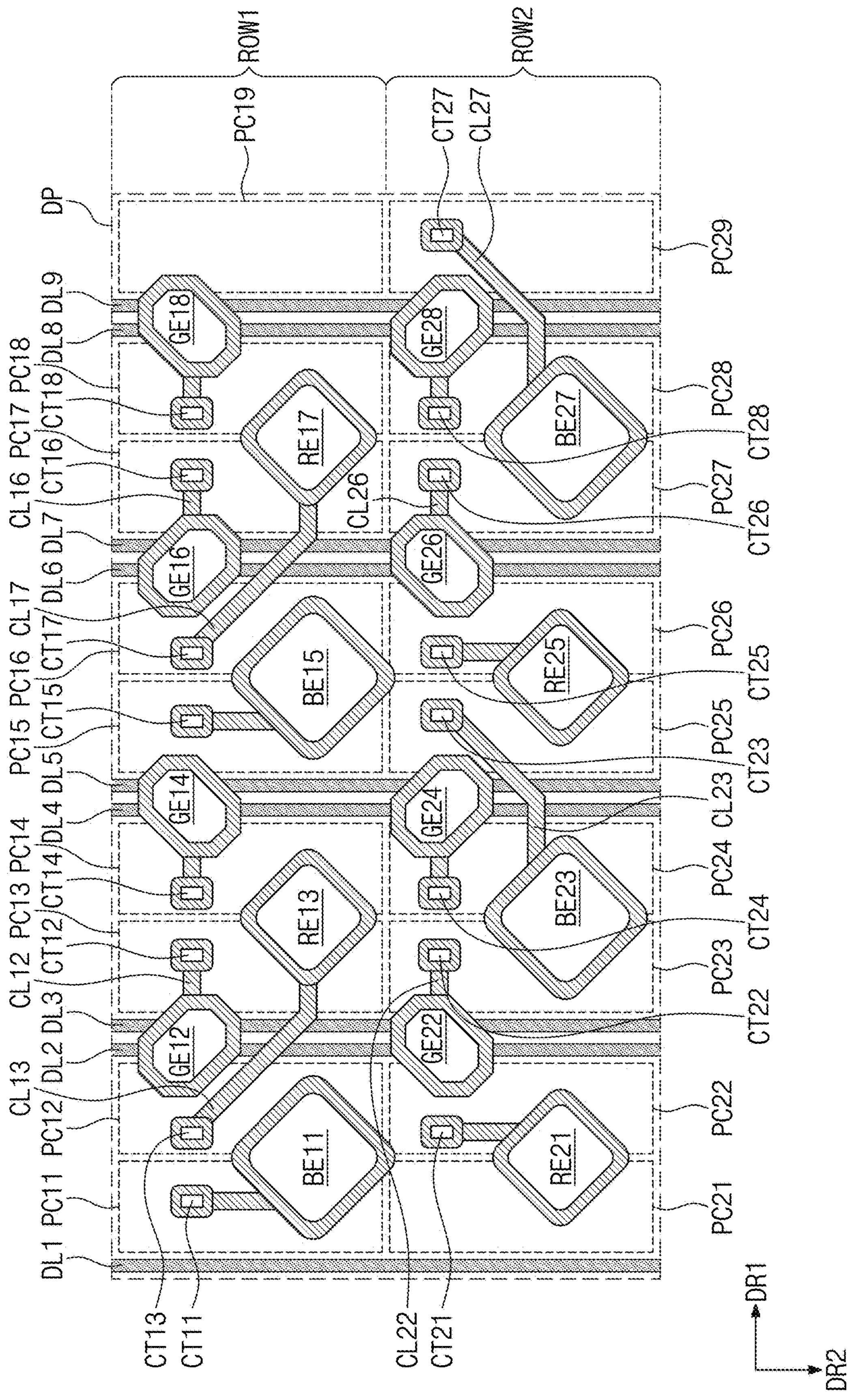
FIG. 5 is a plan view of a display panel according to an embodiment of the present disclosure.

FIG. 5 is a plan view of the display panel DP according to an embodiment of the present disclosure.

The plan view as shown in FIG. 5 is only one example and the present disclosure is not limited thereto.

Referring to FIG. 5, the first light-emitting element BE11, the second light-emitting element GE12, the third light-emitting element RE13, the second light-emitting element GE14, the first light-emitting element BE15, the second light-emitting element GE16, the third light-emitting element RE17, and the second light-emitting element GE18 may be disposed in the first row ROW1. The first-row pixel circuits PC11 to PC19 may be disposed in the first row ROW1. In FIG. 5, an area in which each of the first-row pixel circuits PC11 to PC19 is disposed is indicated by a dotted line. However, the present disclosure is not limited thereto. A shape and/or a size of the area where each of the first-row pixel circuits PC11 to PC19 is disposed may be variously changed.

The first light-emitting element BE11 is electrically connected to the first-row pixel circuit PC11 via a connection node CT11. The second light-emitting element GE12 is electrically connected to the first-row pixel circuit PC13 via the connection wiring CL12 and the connection node CT12. The third light-emitting element RE13 is electrically connected to the first-row pixel circuit PC12 via the connection wiring CL13 and the connection node CT13. The second light-emitting element GE14 is electrically connected to the first-row pixel circuit PC14 via a connection node CT14.

The first light-emitting element BE15 is electrically connected to the first-row pixel circuit PC15 via a connection node CT15. The second light-emitting element GE16 is electrically connected to the first-row pixel circuit PC17 via the connection wiring CL16 and a connection node CT16. The third light-emitting element RE17 is electrically connected to the first-row pixel circuit PC16 via the connection wiring CL17 and a connection node CT17. The second light-emitting element GE18 is electrically connected to the first-row pixel circuit PC18 via a connection node CT18.

A portion of each of the first light-emitting element BE11, the second light-emitting element GE12, the third light-emitting element RE13, the second light-emitting element GE14, the third light-emitting element BE15, the second light-emitting element GE16, the third light-emitting element RE17 and the second light-emitting element GE18 overlaps corresponding one of the first-row pixel circuits PC11 to PC18 in a plan view.

The connection wiring CL13 may intersect the data lines DL2 and DL3 to overlap the data lines DL2 and DL3 in a plan view. The connection wiring CL17 may intersect the data lines DL6 and DL7 to overlap the data lines DL6 and DL7 in a plan view.

Each of the pixel circuits PC11, PC14, PC15, and PC18 may be electrically connected to each of the light-emitting elements BE11, GE14, BE15, and GE18 disposed adjacent thereto (or partially overlapping therewith).

Each of the pixel circuits PC12, PC13, PC16, and PC17 may be electrically connected to each of the light-emitting elements RE13, GE12, RE17, and GE16 through connection lines CL12, CL12, CL17, and CL16, respectively.

The third light-emitting element RE21, the second light-emitting element GE22, the first light-emitting element BE23, the second light-emitting element GE24, the third light-emitting element RE25 and the second light-emitting element GE26, the first light-emitting element BE27 and the second light-emitting element GE28 may be disposed in the second row ROW2. The second-row pixel circuits PC21 to PC29 may be disposed in the second row ROW2. In FIG. 5, an area where each of the second-row pixel circuits PC21 to PC29 is disposed is indicated by a dotted line. However, the present disclosure is not limited thereto. A shape and/or a size of the area where each of the second-row pixel circuits PC21 to PC29 is disposed may be variously changed.

The third light-emitting element RE21 is electrically connected to the second-row pixel circuit PC22 via a connection node CT21. The second light-emitting element GE22 is electrically connected to the second-row pixel circuit PC23 via the connection wiring CL22 and a connection node CT22. The first light-emitting element BE23 is electrically connected to the second-row pixel circuit PC25 via the connection wiring CL23 and a connection node CT23. The second light-emitting element GE24 is electrically connected to the second-row pixel circuit PC24 via a connection node CT24.

The third light-emitting element RE25 is electrically connected to the second-row pixel circuit PC26 via a connection node CT25. The second light-emitting element GE26 is electrically connected to the second-row pixel circuit PC27 via the connection wiring CL26 and a connection node CT26. The first light-emitting element BE27 is electrically connected to the second-row pixel circuit PC29 via the connection wiring CL27 and a connection node CT27. The second light-emitting element GE28 is electrically connected to the second-row pixel circuit PC28 via a connection node CT28.

A portion of each of the third light-emitting element RE21, the second light-emitting element GE22, the first light-emitting element BE23, the second light-emitting element GE24, the third light-emitting element RE25 and the second light-emitting element GE26, the first light-emitting element BE27 and the second light-emitting element GE28 overlaps corresponding one of the second-row pixel circuits PC22 to PC29 in a plan view.

The connection wiring CL23 may intersect the data lines DL4 and DL5 to overlap the data lines DLA and DL5 in a plan view. The connection wiring CL27 may intersect the data lines DL8 and DL9 to overlap the data lines DL8 and DL9 in a plan view.

Each of the pixel circuits PC22, PC24, PC26, and PC28 may be electrically connected to each of the light-emitting elements RE21, GE24, RE25, and GE28 disposed adjacent thereto (or partially overlapping therewith).

Each of the pixel circuits PC23, PC25, OC27, and PC29 may be electrically connected to each of the light-emitting elements GE22, BE23, GE26, and BE27 through connecting lines CL22, CL23, CL26, and CL27, respectively.

As described in FIG. 2, in particular, the data signals G3 and G5 corresponding to the second color light are provided to the data lines DL3 and DLA via the output line YL2 and the first and second switching transistors ST3 and ST4, respectively. Further, the data signals G7 and G8 corresponding to the second color light are provided to the data lines DL7 and DL8 via the output line YL4 and the first and second switching transistors ST7 and ST8, respectively.

The data signals provided to the data lines DL3, DL4, DL7, and DL8 from the data driver circuit 200 via the output lines YL2 and YL4 may be the data signals G3, G4, G7, and G8 corresponding to the same color such that power consumption of the data driver circuit 200 may be reduced.

Figure 6:
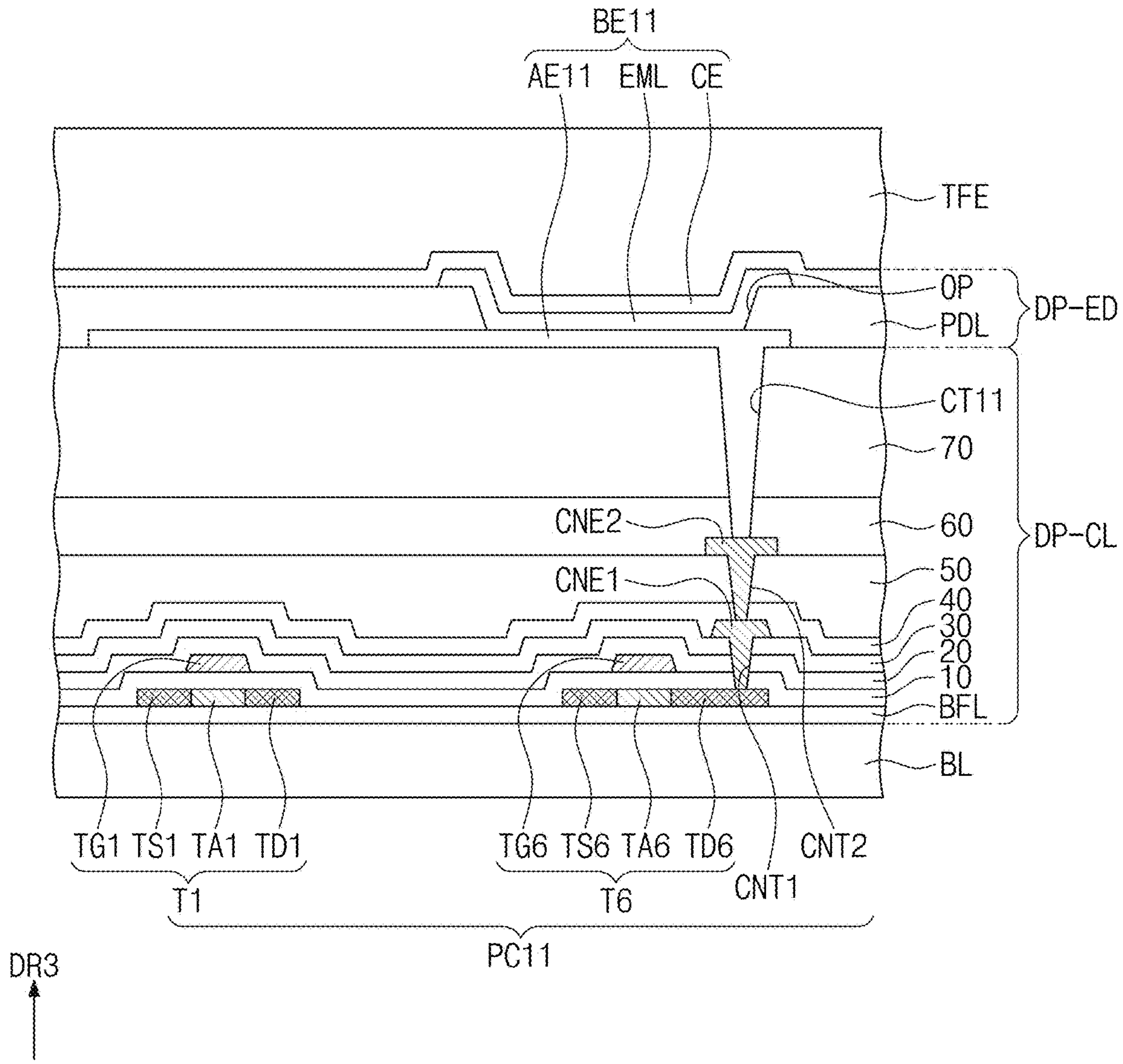
FIG. 6 is a diagram illustrating a cross-section of a portion of each of a first light-emitting element and a first-row pixel circuit of a display panel according to an embodiment of the present disclosure by way of example.

FIG. 6 shows a cross-section of a portion of each of the first light-emitting element BE11 and the first-row pixel circuit PC11 of the display panel DP according to an embodiment of the present disclosure by way of example.

Referring to FIG. 6, the display panel DP includes a base layer BL, a circuit element layer DP-CL, a display element layer DP-ED, and a thin-film encapsulation layer TFE. The display panel DP may further include functional layers such as a refractive index control layer. The circuit element layer DP-CL includes at least a plurality of insulating layers and a circuit element. Hereinafter, the insulating layers may include an organic layer and/or an inorganic layer.

An insulating layer, a semiconductor layer, and a conductive layer are formed using a process such as coating or deposition. Thereafter, the insulating layer, the semiconductor layer, and the conductive layer may be selectively patterned using photolithography and etching processes. In this process, a semiconductor pattern, a conductive pattern, a signal line, etc. are formed. The patterns disposed in the same layer are formed through the same process.

The base layer BL may include a synthetic resin film. The synthetic resin layer may include a thermosetting resin. In particular, the synthetic resin layer may be a polyimide-based resin layer, and the material thereof is not particularly limited. The synthetic resin layer may include at least one of acrylate-based resin, methacrylate-based resin, polyisoprene, vinyl-based resin, epoxy-based resin, urethane-based resin, cellulose-based resin, siloxane-based resin, polyamide-based resin, and perylene-based resin. In addition, the base layer may include a glass substrate, a metal substrate, or an organic/inorganic composite substrate.

At least one inorganic layer is formed on an upper surface of the base layer BL. The inorganic layer may include at least one of aluminum oxide, titanium oxide, silicon oxide silicon oxynitride, zirconium oxide, and hafnium oxide. The inorganic layer may be formed in a stack of multiple layers. At least one of the multiple inorganic layers may constitute a buffer layer BFL.

The buffer layer BFL improves bonding strength between the base layer BL and the semiconductor pattern and/or the conductive pattern. The buffer layer BFL may include a silicon oxide layer and a silicon nitride layer. The silicon oxide layers and the silicon nitride layers may be alternately stacked on top of each other.

The semiconductor pattern is disposed on the buffer layer BFL. The semiconductor pattern may be directly disposed on the buffer layer BFL. The semiconductor pattern may include a silicon semiconductor. The semiconductor pattern may include low-temperature polycrystalline silicon (LTPS). However, the present disclosure is not limited thereto, and the semiconductor pattern may include amorphous silicon or oxide semiconductor.

The silicon semiconductor pattern has electrical properties varying depending on whether it is doped or not. The semiconductor pattern may include a doped area and a non-doped area. The doped area may be doped with an N-type dopant or a P-type dopant. A P-type transistor includes a doped area doped with a P-type dopant.

The doped area has higher conductivity than that of the non-doped area and acts as an electrode or a signal line. The non-doped area actually corresponds to an active area or a channel of a transistor. In other words, one portion of the semiconductor pattern may act as an active area of the transistor, another portion thereof may act as a first electrode (source electrode) or a second electrode (drain electrode) of the transistor, and still another portion thereof may act as a connection electrode or a connection signal line thereof.

As shown in FIG. 6, the first electrode TS1, an active area TA1, and the second electrode TD1 of the first transistor T1 and, the first electrode TS6, an active area TA6, and the second electrode TD6 of the sixth transistor T6 in the first-row pixel circuit PC11 is formed of the semiconductor pattern. The first electrode TS1 and the second electrode TD1 of the first transistor T1 extend in opposite directions from the active area TA1. Further, the first electrode TS6, an active area TA6, and the second electrode TD6 of the sixth transistor T6 are formed of the semiconductor pattern. The first electrode TS6 and the second electrode TD6 of the sixth transistor T6 extend in opposite directions from the active area TA6. Although not separately shown, the first electrode TS6 of the sixth transistor T6 may be connected to the second electrode TD1 of the first transistor T1.

As shown in FIG. 3, the first electrode TS6 of the sixth transistor T6 may be electrically connected to the second electrode TD1 of the first transistor T1.

A first insulating layer 10 is disposed on the buffer layer BFL. The first insulating layer 10 commonly overlaps and covers the semiconductor pattern as shown in FIG. 6. The first insulating layer 10 may be an inorganic layer and/or an organic layer, and may have a single-layer or multi-layer structure. The first insulating layer 10 may include at least one of aluminum oxide, titanium oxide, silicon oxide, silicon oxynitride, zirconium oxide, and hafnium oxide. In this embodiment, the first insulating layer 10 may be a single layer made of silicon oxide. Not only the first insulating layer 10, but also an insulating layer of the circuit element layer DP-CL as described later may be an inorganic layer and/or an organic layer, and may have a single-layer or multi-layer structure. The inorganic layer may include at least one of the above materials.

The gate electrode TG1 of the first transistor T1 and the gate electrode TG6 of the sixth transistor T6 is disposed on the first insulating layer 10. The gate electrodes TG1 and TG6 may be a portion of a metal pattern. The gate electrode TG1 of the first transistor T1 overlaps the active area TA1 of the first transistor T1. In a process of doping the semiconductor pattern, the gate electrode TG1 of the first transistor T1 acts as a self-aligned mask. The gate electrode TG6 of the sixth transistor T6 overlaps the active area TA6 of the first transistor T6. In a process of doping the semiconductor pattern, the gate electrode TG6 of the sixth transistor T6 acts as a self-aligned mask.

A second insulating layer 20 covering the gate electrodes TG1 and TG6 is disposed on the first insulating layer 10. The second insulating layer 20 may commonly overlap the pixel circuits PC11 to PC19, and PC21 to PC29 (see FIG. 6). The second insulating layer 20 may be an inorganic layer and/or an organic layer, and may have a single-layer or multi-layer structure. In this embodiment, the second insulating layer 20 may be a single layer made of silicon oxide.

A third insulating layer 30 is disposed on the second insulating layer 20. In this embodiment, the third insulating layer 30 may be a single layer made of silicon oxide.

A first connection electrode CNE1 may be disposed on the third insulating layer 30. The first connection electrode CNE1 may be connected to the second electrode TD6 of the sixth transistor T6 via a contact-hole CNT1 formed through the first to third insulating layers 10 to 30.

A fourth insulating layer 40 covering the first connection electrode CNE1 may be disposed on the third insulating layer 30. The fourth insulating layer 40 may be a single layer made of silicon oxide. A fifth insulating layer 50 is disposed on the fourth insulating layer 40. The fifth insulating layer 50 may be an organic layer. A second connection electrode CNE2 may be disposed on the fifth insulating layer 50. The second connection electrode CNE2 may be connected to the first connection electrode CNE1 via a contact-hole CNT2 formed through the fourth insulating layer 40 and the fifth insulating layer 50.

A sixth insulating layer 60 covering the second connection electrode CNE2 is disposed on the fifth insulating layer 50. The sixth insulating layer 60 may be an organic layer. A seventh insulating layer 70 is disposed on the sixth insulating layer 60. An anode AE11 is disposed on the seventh insulating layer 70. The anode AE11 is connected to the second connection electrode CNE2 via the connection node CT12 extending through the sixth insulating layer 60 and the seventh insulating layer 70. An opening OP is defined in a pixel defining film PDL. The opening OP of the pixel defining film PDL does not cover at least a portion of the anode AE11, for example, a center portion of the anode AE11.

A light-emitting layer EML is disposed on the anode AE11. The light-emitting layer EML may be disposed to completely cover the portion of the anode AE12 not covered by the pixel defining film PDL. The light-emitting layer EML may be an isolated pattern formed corresponding to each of the pixel circuits PC11 to PC19 and PC21 to PC29 (see FIG. 5).

Although the patterned light-emitting layer EML is illustrated by way of example in this embodiment, the light-emitting layer EML may be formed commonly throughout the pixel circuits PC10 to PC19 and PC21 to PC29. In this regard, the light-emitting layer EML may emit either white light or blue light. Further, the light-emitting layer EML may have a multilayer structure. A cathode CE is disposed on the light-emitting layer EML. The cathode CE is formed commonly throughout the pixel circuits PC11 to PC19 and PC21 to PC29.

Although not shown in the figure, a hole control layer may be disposed between the anode AE11 and the light-emitting layer EML. Further, an electron control layer may be disposed between the light-emitting layer EML and the cathode CE.

The thin-film encapsulation layer TFE is disposed on the cathode CE. The thin-film encapsulation layer TFE is formed commonly throughout the pixel circuits PC11 to PC19 and PC21 to PC29. In this embodiment, the thin-film encapsulation layer TFE directly covers the cathode CE. In an embodiment of the present disclosure, a capping layer directly covering the cathode CE may be further disposed between the cathode CE and the thin-film encapsulation layer TFE.

The thin-film encapsulation layer TFE includes at least an inorganic layer or an organic layer. In an embodiment of the present disclosure, the thin-film encapsulation layer TFE may include two inorganic layers and an organic layer disposed therebetween. In an embodiment of the present disclosure, the thin-film encapsulation layer TFE may include a plurality of inorganic layers and a plurality of organic layers that are alternately stacked with each other.

The encapsulation inorganic layer protects the first light-emitting element BE11 from moisture/oxygen, and the encapsulation organic layer protects the first light-emitting element BE11 from foreign materials such as dust particles. The encapsulation inorganic layer may include a silicon nitride layer, a silicon oxy nitride layer, a silicon oxide layer, a titanium oxide layer, or an aluminum oxide layer. However, the present disclosure is not particularly limited thereto. The encapsulation organic layer may include an acrylate-based organic layer. However, the present disclosure is not particularly limited.

Figure 7:
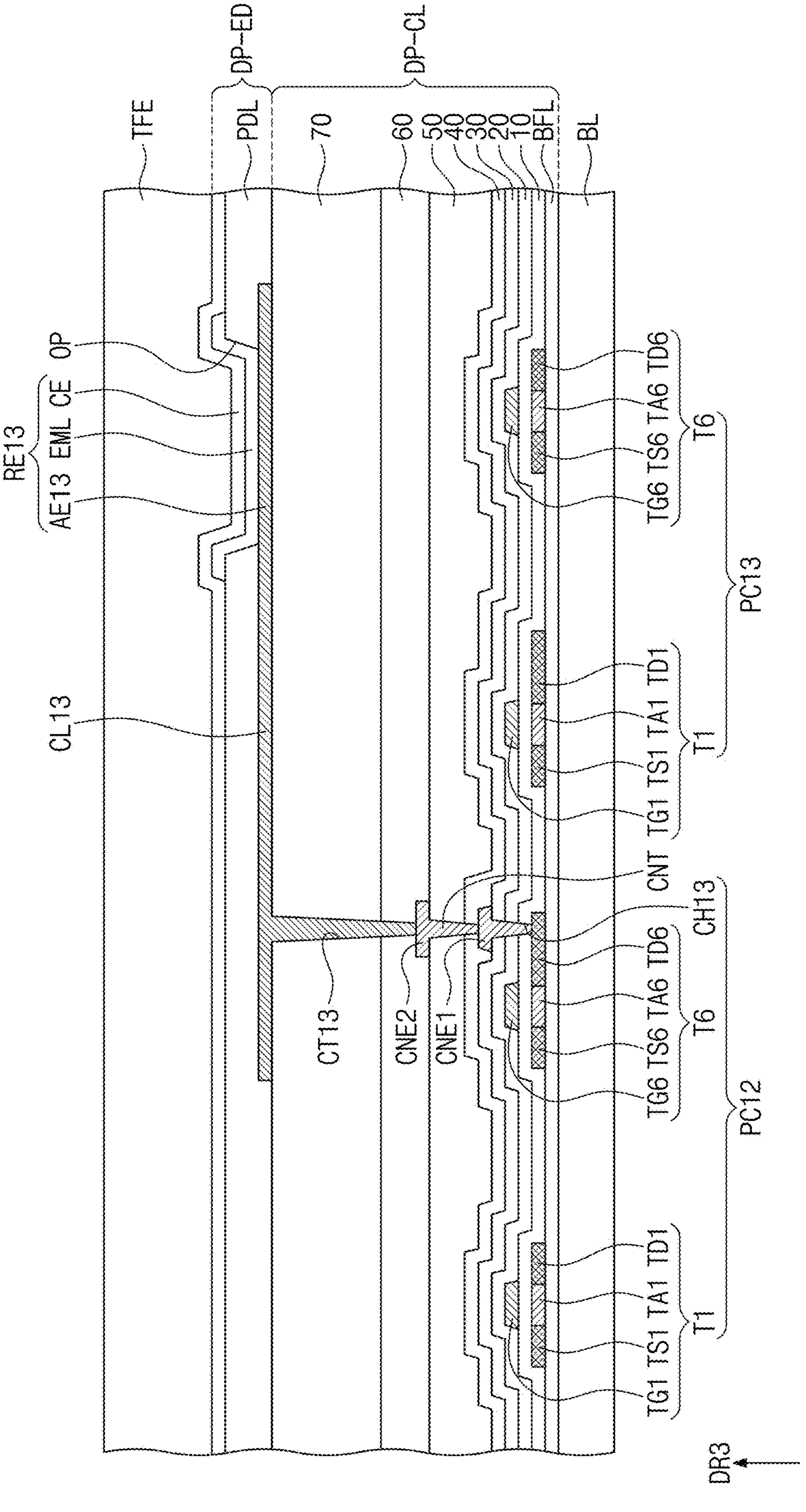
FIG. 7 is a diagram showing a cross-section of a portion of each of a third light-emitting element, a first-row pixel circuit, and another first-row pixel circuit of a display panel according to an embodiment of the present disclosure by way of example.

FIG. 7 shows a cross-section of a portion of each of the third light-emitting element RE13, the first-row pixel circuit PC12 and the first-row pixel circuit PC13 of the display panel DP according to an embodiment of the present disclosure by way of example.

The third light-emitting element RE13 as shown in FIG. 7 may include a configuration similar to that of the first light-emitting element BE11 as shown in FIG. 6. Therefore, duplicate descriptions thereof are omitted.

Each of the first transistor T1 and the sixth transistor T6 of the first-row pixel circuit PC12 as shown in FIG. 7 may have a similar configuration to that of each of the first transistor T1 and the sixth transistor T6 of the first-row pixel circuit PC11 as shown in FIG. 6. Therefore, duplicate descriptions thereof are omitted.

Further, each of the first transistor T1 and sixth transistor T6 of the first-row pixel circuit PC13 as shown in FIG. 7 may have a similar configuration to that of each of the first transistor T1 and the sixth transistor T6 of the first-row pixel circuit PC11 as shown in FIG. 6. Therefore, duplicate descriptions thereof are omitted.

Referring to FIG. 7, the third light-emitting element RE13 may be formed so as to overlap with the first-row pixel circuit PC13. An anode AE13 of the third light-emitting element RE13 extends toward the first-row pixel circuit PC12. A portion of the anode AE13 of the third light-emitting element RE13 may be the connection wiring CL13. The connection wiring CL13 is connected to the second connection electrode CNE2 via the connection node CT13 (or a contact-hole) extending through the seventh insulating layer 70 and the sixth insulating layer 60. The second connection electrode CNE2 may be connected to the first connection electrode CNE1 via a contact-hole CNT formed through the fourth insulating layer 40 and the fifth insulating layer 50. The first connection electrode CNE1 may be connected to the second electrode TD6 of the sixth transistor T6 of the first-row pixel circuit PC13 via the connection portion CH13 (or a contact-hole) extending through the first to third insulating layers 10 to 30.

That is, the anode AE13 of the third light-emitting element RE13 may be electrically connected to the second electrode TD6 of the sixth transistor T6 of the first-row pixel circuit PC12 via the connection wiring CL13, the connection node CT13, the second connection electrode CNE2 and the first connection electrode CNE1.

Figure 8:
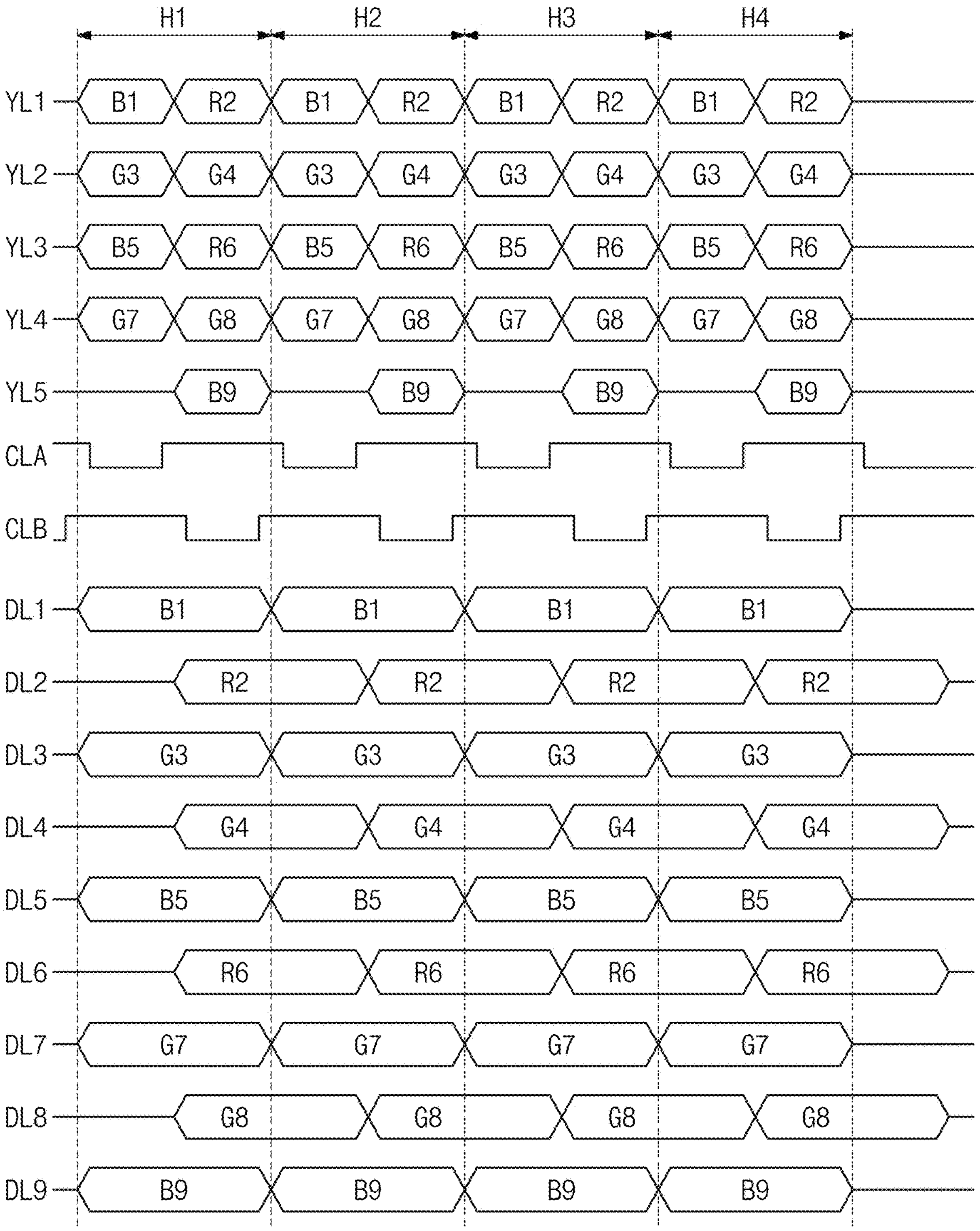
FIG. 8 is a timing diagram for illustrating an operation of a display device.

FIG. 8 is a timing diagram for illustrating an operation of the display device DD according to an embodiment of the present disclosure.

Referring to FIG. 1, FIG. 2 and FIG. 8, the data driver circuit 200 sequentially outputs the data signals B1, R2, B1, R2, B1, R2, B1 and R2 to demultiplexer 500 via the output line YL1.

The data driver circuit 200 sequentially outputs the data signals G3, G4, G3, G4, G3, G4, G3 and G4 to the demultiplexer 500 via the output line YL2.

The data driver circuit 200 sequentially outputs data signals B5, R6, B5, R6, B5, R6, B5 and R6 to the demultiplexer 500 via the output line YL3.

The data driver circuit 200 sequentially outputs the data signals G7, G8, G7, G8, G7, G8, G7 and G8 to the demultiplexer 500 via the output line YL4.

The data driver circuit 200 sequentially output data signals B9, B9, B9, and B9 to the demultiplexer 500 via the output line YL5.

The first switching signal CLA and the second switching signal CLB are sequentially activated to a low level in each of horizontal periods H1, H2, H3, and H4. For example, the first switching signal CLA is activated to a low level, and then, the second switching signal CLB is activated to a low level during the horizontal period H1. In one embodiment, a low level period of the first switching signal CLA and a low level period of the second switching signal CLB do not overlap each other.

The demultiplexer 500 outputs the data signals from the output lines YL1, YL2, YL3, YL4, and YL5 to the data lines DL1, DL3, DL5, DL7, and DL9 when the first switching signal CLA is at a low level.

The demultiplexer 500 outputs the data signals from the output lines YL1, YL2, YL3, and YL4 to the data lines DL2, DL4, DL6, and DL8 when the second switching signal CLB is at a low level.

Therefore, only the data signal B1 corresponding to the first color light may be provided to the data line DL1. The data signal B1 of the data line DL1 may be provided to the first-row pixel circuit PC11.

Only the data signal R2 corresponding to the third color light may be provided to the data line DL2. The data signal R2 of the data line DL2 may be provided to the first-row pixel circuit PC12 and the second-row pixel circuit PC22.

Only the data signal G3 corresponding to the second color light may be provided to the data line DL3. The data signal G3 of the data line DL3 may be provided to the first-row pixel circuit PC13 and the second-row pixel circuit PC23.

Only the data signal G4 corresponding to the second color light may be provided to the data line DL4. The data signal G4 of the data line DL4 may be provided to the first-row pixel circuit PC14 and the second-row pixel circuit PC24.

Only the data signal B5 corresponding to the first color light may be provided to the data line DL5. The data signal B5 of the data line DL5 may be provided to the first-row pixel circuit PC15 and the second-row pixel circuit PC25.

Only the data signal R6 corresponding to the third color light may be provided to the data line DL6. The data signal R6 of the data line DL6 may be provided to the first-row pixel circuit PC16 and the second-row pixel circuit PC26.

Only the data signal G7 corresponding to the second color light may be provided to the data line DL7. The data signal G7 of the data line DL7 may be provided to the first-row pixel circuit PC17 and the second-row pixel circuit PC27.

Only the data signal G8 corresponding to the second color light may be provided to the data line DL8. The data signal G8 of the data line DL8 may be provided to the first-row pixel circuit PC18 and the second-row pixel circuit PC28.

Only data signal B9 corresponding to the first color light may be provided to the data line DL9. The data signal B9 of the data line DL9 may be provided to the second-row pixel circuit PC29.

Each of the data lines DL1 to DL9 may receive a data signal corresponding to one color light. Thus, unnecessary charge/discharge operations in the data lines DL1 to DL9 are reduced. As a result, power consumption in the display panel DP may be minimized.

In each of the horizontal cycles H1, H2, H3, and H4, the output line YL2 alternately outputs the data signals G3 and G4 corresponding to the second color light, and the output line YL4 alternately outputs the data signal G7 and G8 corresponding to the second color light. Therefore, unnecessary charge and discharge operations in the output lines YL2 and YL4 are reduced. Therefore, power consumption of the data driver circuit 200 may be minimized.

Figure 9:
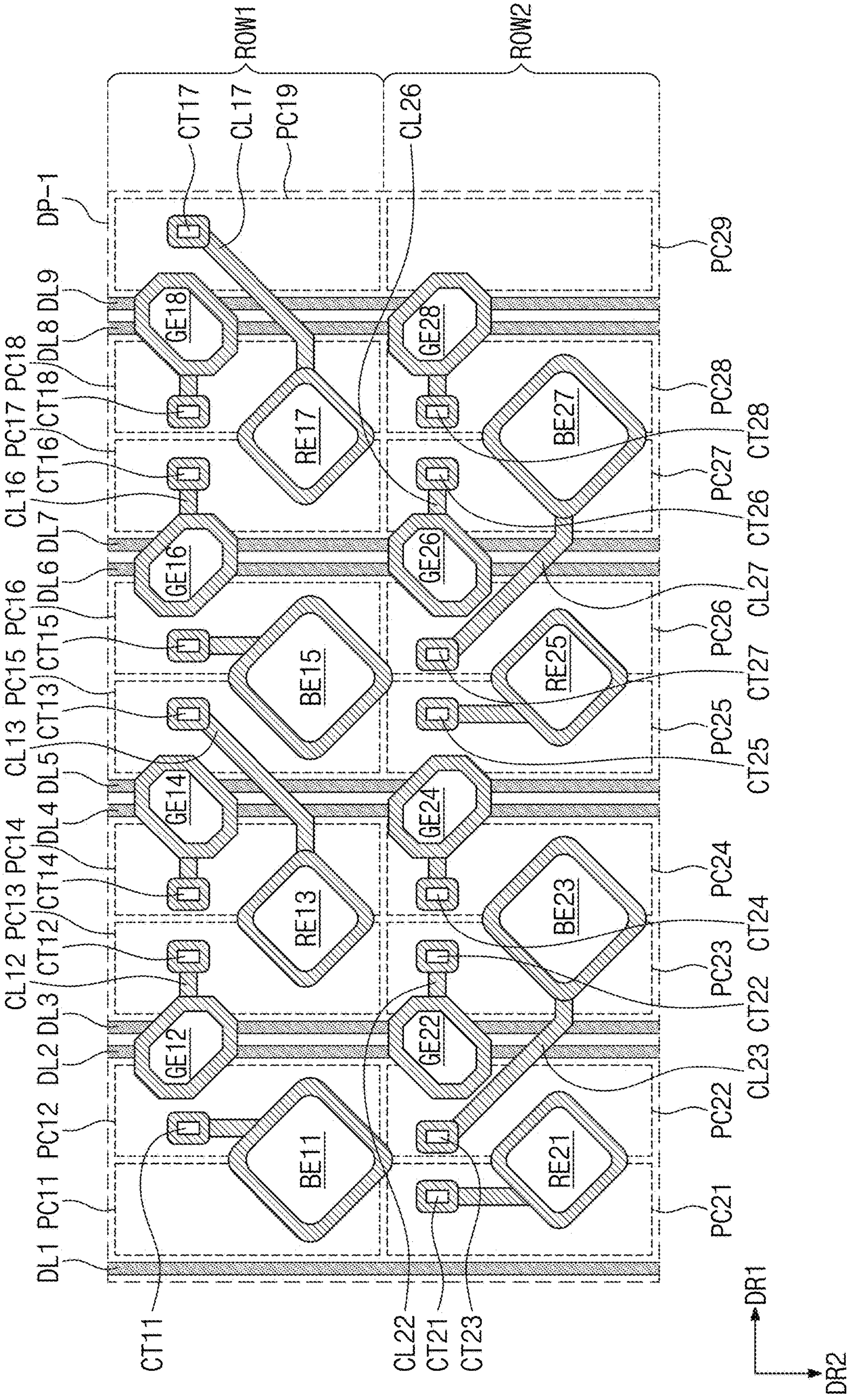
FIG. 9 is a plan view of a display panel according to an embodiment of the present disclosure.

FIG. 9 is a plan view of a display panel DP-1 according to an embodiment of the present disclosure.

Components similar to those of the display panel DP as shown in FIG. 5 among components of the display panel DP-1 as shown in FIG. 9 may be indicated using the same reference numerals as those in FIG. 5. Duplicate descriptions thereof may be omitted.

Each of the first light-emitting element BE11, the second light-emitting element GE12, the third light-emitting element RE13, the second light-emitting element GE14, the first light-emitting element BE15, the second light-emitting element GE16, the third light-emitting element RE17 and the second light-emitting element GE18 is connected to corresponding one of the first row pixel circuits PC12 to PC19.

Each of the third light-emitting element RE21, the second light-emitting element GE22, the first light-emitting element BE23, the second light-emitting element GE24, the third light-emitting element RE25 and the second light-emitting element GE26, the first light-emitting element BE27 and the second light-emitting element GE28 is connected to corresponding one of the second-row pixel circuits PC21 to PC28.

In the embodiment as shown in FIG. 5, the third light-emitting elements RE13 and RE17 disposed in the first row ROW1 are electrically connected to the first-row pixel circuits PC12 and PC16, respectively. Each of the first-row pixel circuits PC12 and PC16 is disposed on a left side of each of the third light-emitting elements RE13 and RE17 which does not overlap with each of the first-row pixel circuits PC12 and PC16.

In an embodiment as shown in FIG. 9, the third light-emitting elements RE13 and RE17 disposed in the first row ROW1 are electrically connected to the first-row pixel circuits PC15 and PC19, respectively. Each of the first-row pixel circuits PC15 and PC19 is disposed on a right side of each of the third light-emitting elements RE13 and RE17 and does not overlap with each of the third light-emitting elements RE13 and RE17.

That is, the third light-emitting element RE13 is electrically connected to the first-row pixel circuit PC15 via the connection wiring CL13 and the connection node CT13. The third light-emitting element RE17 is electrically connected to the first-row pixel circuit PC19 via the connection wiring CL17 and the connection node CT17.

The connection wiring CL13 intersects the data lines DL4 and DL5 to overlap the data lines DL4 and DL5. The connection wiring CL17 intersects the data lines DL8 and DL9 to overlap the data lines DL8 and DL9.

In the embodiment as shown in FIG. 5, the first light-emitting elements BE23 and BE27 disposed in the second row ROW2 are electrically connected to the second-row pixel circuits PC25 and PC29, respectively. Each of the second-row pixel circuits PC25 and PC29 is disposed on a right side of each of the first light-emitting elements BE23 and BE27, and does not overlap with each of the first light-emitting elements BE23 and BE27.

In the embodiment as shown in FIG. 9, the first light-emitting elements BE23 and BE27 disposed in the second row ROW2 are electrically connected to the second-row pixel circuits PC22 and PC26, respectively. Each of the second-row pixel circuits PC22 and PC26 is disposed on a left side of each of the first light-emitting elements BE23 and BE27, and does not overlap with each of the first light-emitting elements BE23 and BE27.

That is, the first light-emitting element BE23 is electrically connected to the second-row pixel circuit PC22 via the connection wiring CL23 and the connection node CT23. The first light-emitting element BE27 is electrically connected to the second-row pixel circuit PC26 via the connection wiring CL27 and the connection node CT27.

The connection wiring CL23 intersects the data lines DL2 and DL3 to overlap the data lines DL2 and DL3. The connection wiring CL27 intersects the data lines DL6 and DL7 to overlap the data lines DL6 and DL7.

In the embodiment as shown in FIG. 9, the data signals corresponding to the third color light, the first color light, the second color light, the second color light, the third color light, the first color light, the second color light, the second color light, and the third color light may be transferred to the data lines DL1 to DL9, respectively. Therefore, unnecessary charge/discharge operations in the data lines DL1 to DL9 are reduced. As a result, power consumption in the display panel DP may be minimized.

As described in FIG. 2, in particular, the data signals G3 and G4 corresponding to the second color light are provided to the data lines DL3 and DL4 via the output line YL2 and the first and second switching transistors ST3 and ST4, respectively. Further, the data signals G7 and G8 corresponding to the second color light are provided to the data lines DL7 and DL8 via the output line YL4 and the first and second switching transistors ST7 and ST8, respectively.

The data signals provided to the data lines DL3, DL4, DL7, and DL8 from the data driver circuit 200 via the output lines YL2 and YL4 are the data signals G3, G4, G7, and G8 corresponding to the same color. Thus, the power consumption of the data driver circuit 200 may be reduced.

Figure 10:
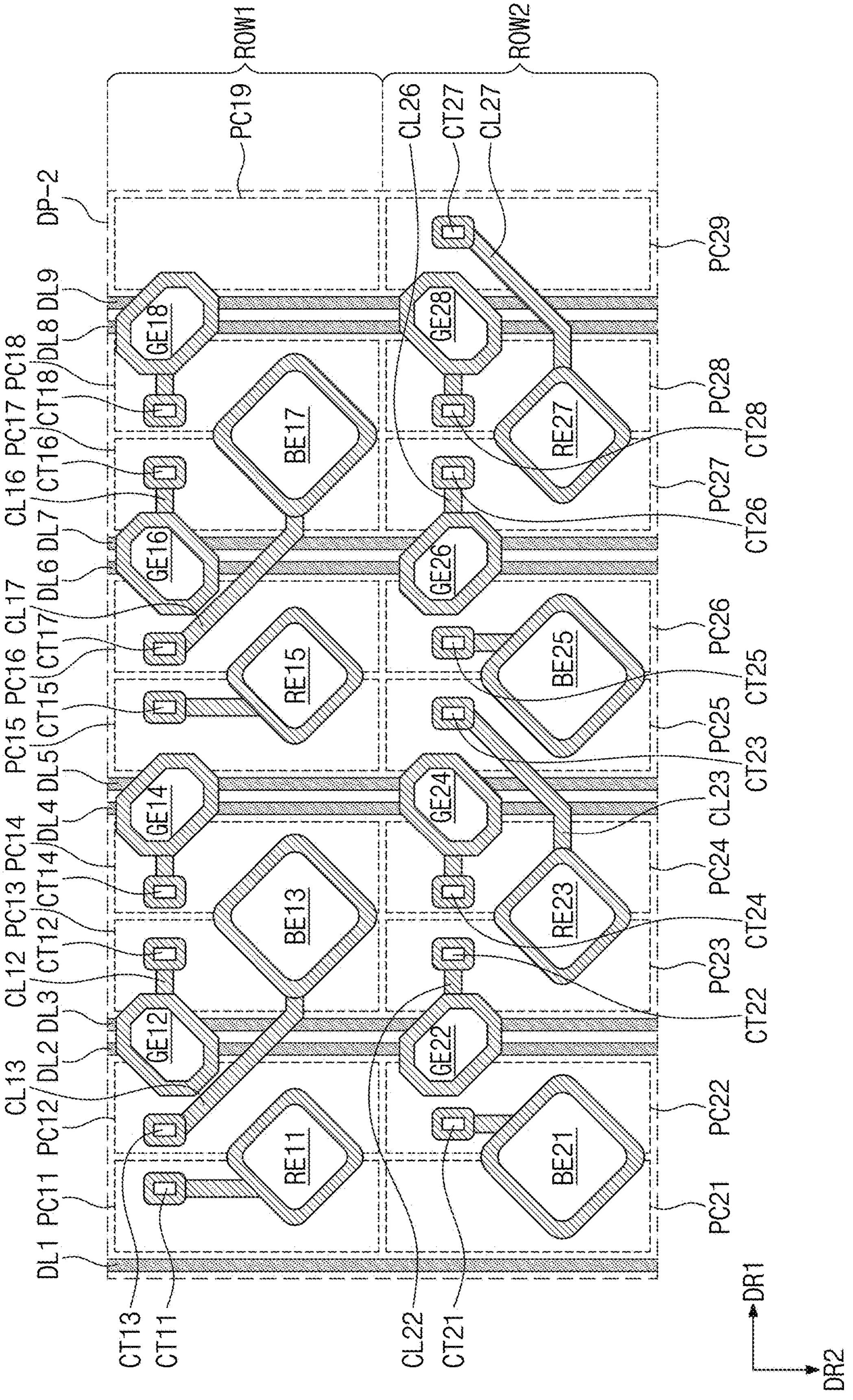
FIG. 10 is a plan view of a display panel according to an embodiment of the present disclosure.

FIG. 10 is a plan view of a display panel DP-2 according to an embodiment of the present disclosure.

Components similar to those of the display panel DP as shown in FIG. 5 among components of the display panel DP-2 as shown in FIG. 10 may be indicated using the same reference numerals as those in FIG. 5. Duplicate descriptions thereof may be omitted.

In the embodiment as shown in FIG. 10, the third light-emitting element RE11, the second light-emitting element GE12, the first light-emitting element BE13, the second light-emitting element GE14, the third light-emitting element RE15, the second light-emitting element GE16, the first light-emitting element BE17, and the second light-emitting element GE18 are sequentially arranged in the first row ROW1 in the first direction DR1.

Each of the third light-emitting element RE11, the second light-emitting element GE12, the first light-emitting element BE13, the second light-emitting element GE14, the third light-emitting element RE15, the second light-emitting element GE16, the first light-emitting element BE17 and the second light-emitting element GE18 is connected to corresponding one of the first-row pixel circuits PC11 to PC18.

In the embodiment as shown in FIG. 10, the first light-emitting elements BE13 and BE17 disposed in the first row ROW1 are electrically connected to the first-row pixel circuits PC12 and PC16, respectively. Each of the first-row pixel circuits PC12 and PC16 is disposed on a left side of each of the first light-emitting elements BE13 and BE17, and does not overlap with each of the first light-emitting elements BE13 and BE17.

That is, the first light-emitting element BE13 is electrically connected to the first-row pixel circuit PC12 via the connection wiring CL13 and the connection node CT13. The first light-emitting element BE17 is electrically connected to the first-row pixel circuit PC16 via the connection wiring CL17 and the connection node CT17.

The connection wiring CL13 intersects the data lines DL2 and DL3 to overlap the data lines DL2 and DL3. The connection wiring CL17 intersects the data lines DL6 and DL7 to overlap the data lines DL6 and DL7.

In the embodiment as shown in FIG. 10, the first light-emitting element BE21, the second light-emitting element GE22, the third light-emitting element RE23, the second light-emitting element GE24, the first light-emitting element BE25, the second light-emitting element GE26, the third light-emitting element RE27, and the second light-emitting element GE28 are sequentially arranged in the second row ROW2 in the first direction DR1.

Each of the first light-emitting element BE21, the second light-emitting element GE22, the third light-emitting element RE23, the second light-emitting element GE24, the first light-emitting element BE25, the second light-emitting element GE26, the third light-emitting element RE27 and the second light-emitting element GE28 is connected to corresponding one of the second-row pixel circuits PC22 to PC29.

In the embodiment as shown in FIG. 10, the third light-emitting elements RE23 and RE27 disposed in the second row ROW2 are electrically connected to the second-row pixel circuits PC25 and PC29, respectively. Each of the second-row pixel circuits PC25 and PC29 is disposed on a right side of each of the third light-emitting elements RE23 and RE27, and does not overlap with each of the third light-emitting elements RE23 and RE27.

That is, the third light-emitting element RE23 is electrically connected to the second-row pixel circuit PC25 via the connection wiring CL23 and the connection node CT23. The third light-emitting element RE27 is electrically connected to the second-row pixel circuit PC29 via the connection wiring CL27 and the connection node CT27.

The connection wiring CL23 intersects the data lines DL4 and DL5 to overlap the data lines DL4 and DL5. The connection wiring CL27 intersects the data lines DL8 and DL9 to overlap the data lines DL8 and DL9.

In the embodiment as shown in FIG. 10, the data signals corresponding to the third color light, the first color light, the second color light, the second color light, the third color light, the first color light, the second color light, the second color light and the third color light may be transferred to the data lines DL1 to DL9, respectively. Therefore, unnecessary charge/discharge operations in the data lines DL1 to DL9 are reduced. As a result, power consumption in the display panel DP may be minimized.

Further, as described in FIG. 2, in particular, the data signals G3 and G4 corresponding to the second color light are provided to the data lines DL3 and DL4 via the output line YL2 and the first and second switching transistors ST3 and ST4, respectively. Further, the data signals G7 and G8 corresponding to the second color light are provided to the data lines DL7 and DL8 via the output line YL4 and the first and second switching transistors ST7 and ST8, respectively.

The data signals provided to the data lines DL3, DL4, DL7, and DL8 from the data driver circuit 200 via the output lines YL2 and YL4 are data signals G3, G4, G7, and G8 corresponding to the same color. Thus, the power consumption of the data driver circuit 200 may be reduced.

Figure 11:
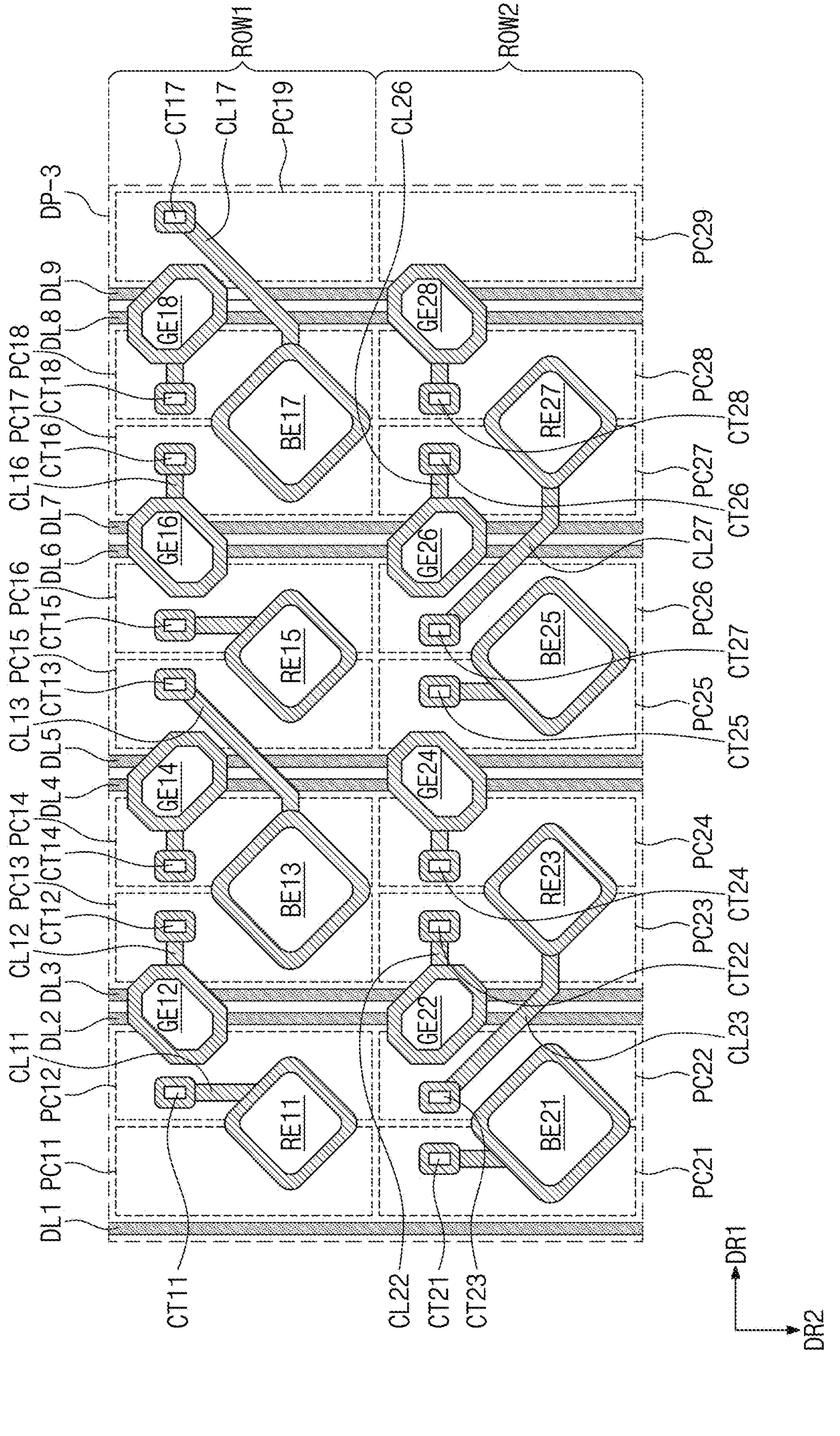
FIG. 11 is a plan view of a display panel according to an embodiment of the present disclosure.

FIG. 11 is a plan view of a display panel DP-3 according to an embodiment of the present disclosure.

Components similar to those of the display panel DP as shown in FIG. 5 among components of the display panel DP-3 as shown in FIG. 11 may be indicated using the same reference numerals as those in FIG. 5. Duplicate descriptions thereof may be omitted.

In the embodiment as shown in FIG. 11, the third light-emitting element RE11, the second light-emitting element GE12, the first light-emitting element BE13, the second light-emitting element GE14, the third light-emitting element RE15, the second light-emitting element GE16, the first light-emitting element BE17, and the second light-emitting element GE18 are sequentially arranged in the first row ROW1 in the first direction DR1.

Each of the third light-emitting element RE11, the second light-emitting element GE12, the first light-emitting element BE13, the second light-emitting element GE14, the third light-emitting element RE15, the second light-emitting element GE16, the first light-emitting element BE17, and the second light-emitting element GE18 is connected to corresponding one of the first row pixel circuits PC12 to PC19.

In the embodiment as shown in FIG. 11, the first light-emitting elements BE13 and BE17 disposed in the first row ROW1 are electrically connected to the first-row pixel circuits PC15 and PC19, respectively. Each of the first-row pixel circuits PC15 and PC19 is disposed on a right side of each of the first light-emitting elements BE13 and BE17, and does not overlap each of the first light-emitting elements BE13 and BE17.

That is, the first light-emitting element BE13 is electrically connected to the first-row pixel circuit PC15 via the connection wiring CL13 and the connection node CT13. The first light-emitting element BE17 is electrically connected to the first-row pixel circuit PC19 via the connection wiring CL17 and the connection node CT17.

The connection wiring CL13 intersects the data lines DL4 and DL5 to overlap the data lines DL4 and DL5. The connection wiring CL17 intersect the data lines DL8 and DL9 to overlap the data lines DL8 and DL9.

In the embodiment as shown in FIG. 11, the first light-emitting element BE21, the second light-emitting element GE22, the third light-emitting element RE23, the second light-emitting element GE24, the first light-emitting element BE25, the second light-emitting element GE26, the third light-emitting element RE27, and the second light-emitting element GE28 are sequentially arranged in the second row ROW2 in the first direction DR1.

Each of the first light-emitting element BE21, the second light-emitting element GE22, the third light-emitting element RE23, the second light-emitting element GE24, the first light-emitting element BE25, the second light-emitting element GE26, the third light-emitting element RE27 and the second light-emitting element GE28 is connected to corresponding one of the second-row pixel circuits PC21 to PC28.

In the embodiment as shown in FIG. 11, the third light-emitting elements RE23 and RE27 disposed in the second row ROW2 are electrically connected to the second-row pixel circuits PC22 and PC26, respectively. Each of the second-row pixel circuits PC22 and PC26 is disposed on a left side of each of the third light-emitting elements RE23 and RE27, and does not overlap with each of the third light-emitting elements RE23 and RE27.

That is, the third light-emitting element RE23 is electrically connected to the second-row pixel circuit PC22 via the connection wiring CL23 and the connection node CT23. The third light-emitting element RE27 is electrically connected to the second-row pixel circuit PC26 via the connection wiring CL27 and the connection node CT27.

The connection wiring CL23 intersects the data lines DL2 and DL3 to overlap the data lines DL2 and DL3. The connection wiring CL27 intersects the data lines DL68 and DL7 to overlap the data lines DL68 and DL7.

In the embodiment as shown in FIG. 11, the data signals corresponding to the first color light, the third color light, the second color light, the second color light, the first color light, the third color light, the second color light, the second color light, and the first color light may be transmitted to the data lines DL1 to DL9, respectively. Therefore, unnecessary charge/discharge operations in the data lines DL1 to DL9 are reduced. As a result, power consumption in the display panel DP may be minimized.

Figure 12:
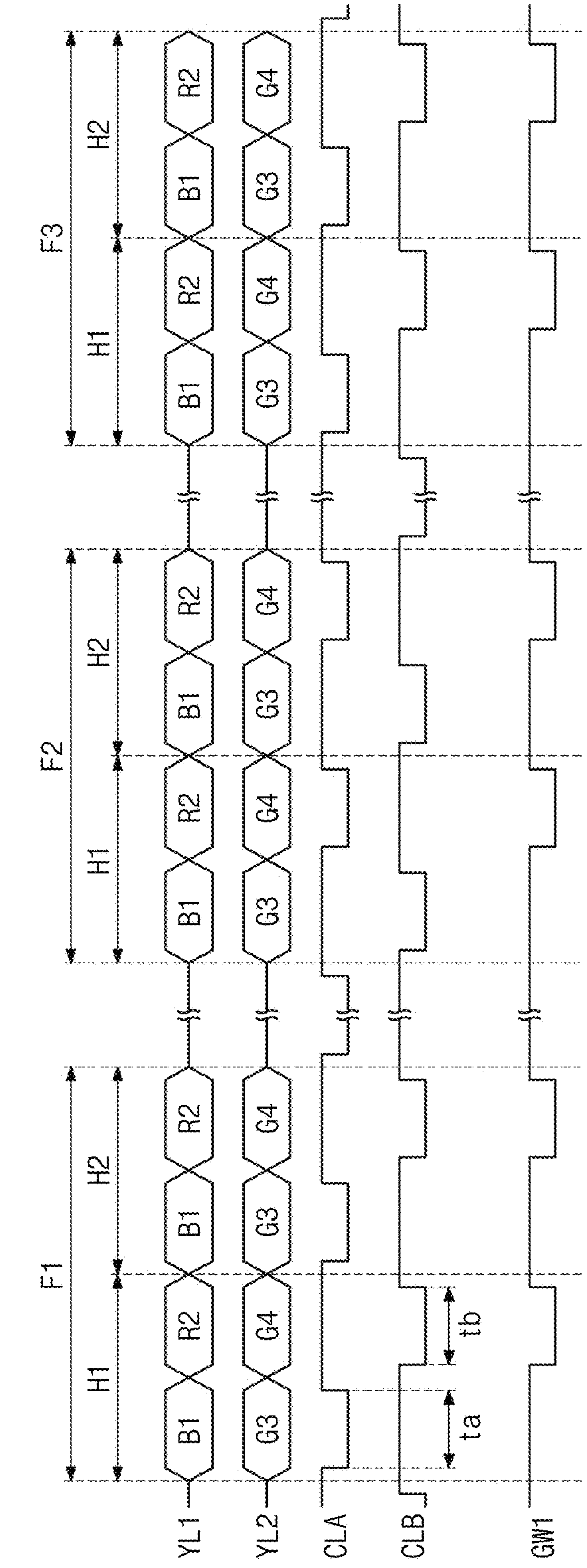
FIG. 12 is a timing diagram for illustrating an operation of a display device according to an embodiment of the present disclosure.

FIG. 12 is a timing diagram for illustrating an operation of the display device DD according to an embodiment of the present disclosure.

Referring to FIG. 2 and FIG. 12, the data driver circuit 200 sequentially outputs the data signals B1, R2, B1, and R2 to the demultiplexer 500 via the output line YL1.

The data driver circuit 200 sequentially outputs the data signals G3, G4, G3, and G4 to the demultiplexer 500 via the output line YL2.

When the first switching signal CLA is activated to a low level for a first period ta within the horizontal period H1 of a first frame F1, the data signal G3 provided to the output line YL2 is provided to the data line DL3. Thereafter, when the second switching signal CLB is activated to a low level for a second period tb within the horizontal period H1 of the first frame F1, the data signal G4 provided to the output line YL2 is provided to the data line DL4.

As shown in FIG. 3, when the scan signal GW1 transitions to a low level for the second period tb, each of the data signals G3 and G4 may be transmitted to the first transistor T1 via the second transistor T2 in each of the pixel circuits PC13 and PC14.

In this regard, for the second period tb, the first switching signal CLA is at a high level such that the first switching transistor ST3 is turned off, and the second switching signal CLB is at a low level such that the second switching transistor ST4 is turned on.

That is, the data line DL2 is connected to the output line YL1 via the second switching transistor ST2 which is turned on in response to the second switching signal CLB which is at a low level while the scan signal GW1 is at a low level for the second period tb. However, the first switching transistor ST1 is turned off in response to the first switching signal CLA having a high level for the second period tb, such that the data line DL1 holds the previously transmitted data signal B1. That is, the data line DL1 is substantially in a floating state for the second period tb, such that a voltage level of the data signal B1 transmitted to the data line DL1 may be changed due to coupling with neighboring wirings.

According to an order in which the first switching signal CLA and the second switching signal CLB are activated, the data signal delivered to the first transistor T1 (see FIG. 3) in the pixel circuit PC11, and the data signal delivered to the first transistor T1 in the pixel circuit PC12 may be different from each other.

In particular, a difference between luminance of the data lines DL3 and DL4 to which the data signals G3 and G4 of the same color are transmitted, respectively may be better perceived by a user.

In each of the horizontal periods H1 and H2 for the first frame F1, the first switching signal CLA is first activated to a low level, and then the second switching signal CLB is activated to a low level.

In each of the horizontal periods H1 and H2 for a second frame F2, the second switching signal CLB is first activated to a low level, and then the first switching signal CLA is activated to a low level.

In each of the horizontal periods H1 and H2 for a third frame F3, the first switching signal CLA is first activated to a low level, and then the second switching signal CLB is activated to a low level.

That is, for the first frame F1, while the scan signal GW1 is at a low level, the data line DL2 is connected to the output line YL1 in response to the second switching signal CLB which is at a low level.

For the second frame F2, while the scan signal GW1 is at a low level, the data line DL1 is connected to the output line YL1 in response to the first switching signal CLA which is at a low level.

For the third frame F3, while the scan signal GW1 is at a low level, the data line DL2 is connected to output line YL1 in response to the second switching signal CLB which is at low level.

In this way, the order in which the first switching signal CLA and the second switching signal CLB are activated may change on a frame basis, such that the data lines DL1 and DL2 may be alternately connected to the output line Y1 while the scan signal GW1 is at a low level. Therefore, the luminance difference may be prevented from being recognized by the user.

Figure 13:
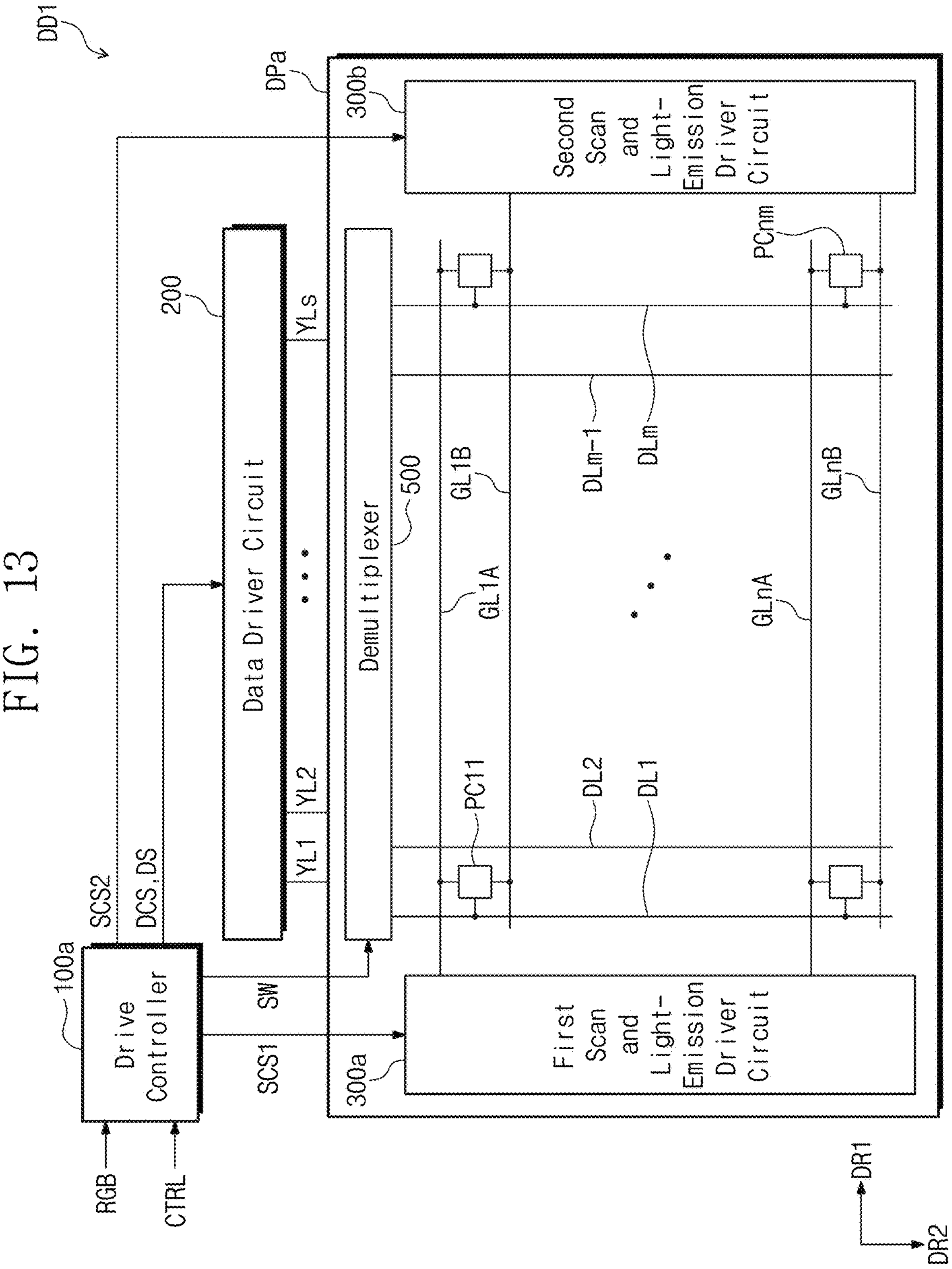
FIG. 13 is a block diagram of a display device according to an embodiment of the present disclosure.

FIG. 13 is a block diagram of a display device DD1 according to an embodiment of the present disclosure.

Components similar to those of the display device DD as shown in FIG. 1 among components of the display device DD1 as shown in FIG. 13 may be indicated using the same reference numerals as those in FIG. 1. Duplicate descriptions thereof may be omitted.

A display panel DPa may include a first scan and light-emission driver circuit 300*a*, a second scan and light-emission driver circuit 300*b*, and the demultiplexer 500. The first scan and light-emission driver circuit 300*a* and the second scan and light-emission driver circuit 300*b* in FIG. 13 may replace the scan driver circuit 300 and the light-emission driver circuit 400 in FIG. 1.

The first scan and light-emission driver circuit 300*a* receives a scan control signal SCS1 from a drive controller 100*a*. The first scan and light-emission driver circuit 300*a* may output scan signals to scan lines GL1A to GLnA in response to the scan control signal SCS1. The second scan and light-emission driver circuit 300*b* receives a scan control signal SCS2 from the drive controller 100*a*. The second scan and light-emission driver circuit 300*b* may output scan signals to scan lines GL1B-GLnB in response to the scan control signal SCS2.

Each of the scan lines GL1A to GLnA and the scan lines GL1B to GLnB may transmit a plurality of scan signals. For example, in the example as shown in FIG. 13, the scan line GL1A may transmit scan signals GW1A (see FIG. 15), GC1, GI1, and the light-emission control signal EM1. The scan line GL1B may transmit scan signals GW1B (refer to FIG. 15), GC1, and GI1 and the light-emission control signal EM1.

Figure 14:
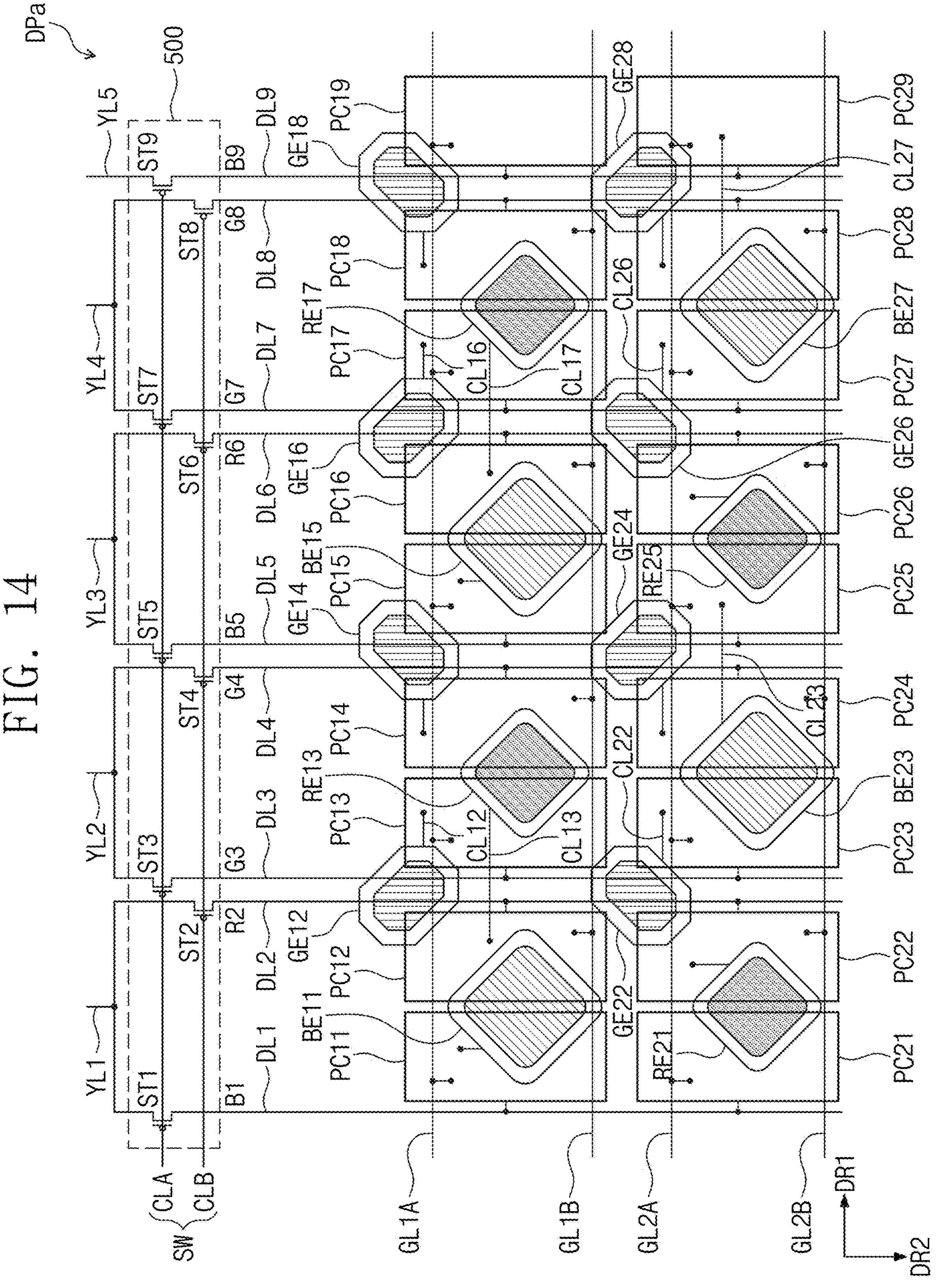
FIG. 14 is a diagram showing pixel circuits and light-emitting elements disposed in a display panel according to an embodiment of the present disclosure.

FIG. 14 is a diagram showing pixel circuits and light-emitting elements disposed in the display panel DPa according to an embodiment of the present disclosure.

Components similar to those of the display panel DP as shown in FIG. 2 among components of the display panel DPa as shown in FIG. 14 may be indicated using the same reference numerals as those in FIG. 2. Duplicate descriptions thereof may be omitted.

Referring to FIG. 14, some of the first-row pixel circuits PC11 to PC19 may be connected to the scan line GL1A, and the others thereof may be connected to the scan line GL1B.

In one embodiment, the pixel circuits PC11, PC13, PC15, PC17, and PC19 are connected to the scan line GL1A, while the pixel circuits PC12, PC14, PC16, and PC18 are connected to the scan line GL1B.

In one embodiment, some of the second-row pixel circuits PC21 to PC29 may be connected to the scan line GL2A, and the others thereof may be connected to the scan line GL2B.

In one embodiment, pixel circuits PC21, PC23, PC25, PC27, PC29 are connected to the scan line GL2A, while the pixel circuits PC22, PC24, PC26, and PC28 are connected to the scan line GL2B.

Figure 15:
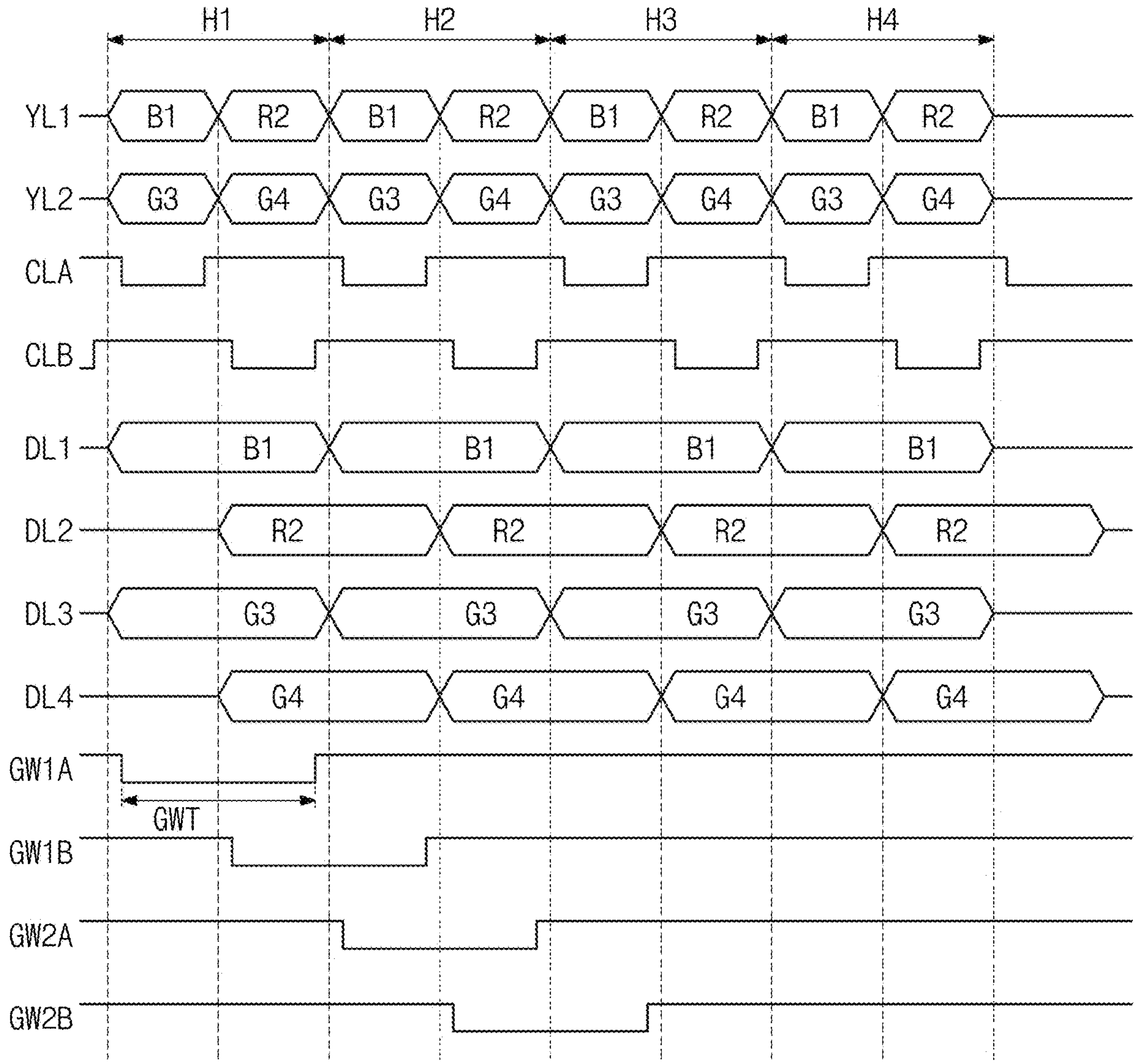
FIG. 15 is a timing diagram for illustrating an operation of a display device according to an embodiment of the present disclosure.

FIG. 15 is a timing diagram for illustrating an operation of the display device DD1 according to an embodiment of the present disclosure.

Referring to FIG. 13, FIG. 14 and FIG. 15, the data driver circuit 200 sequentially outputs the data signals B1, R2, B1, R2, B1, R2, B1 and R2 to the demultiplexer 500 via the output line YL1.

The data driver circuit 200 sequentially outputs the data signals G3, G4, G3, G4, G3, G4, G3 and G4 to the demultiplexer 500 via the output line YL2.

The first switching signal CLA and the second switching signal CLB are sequentially activated to a low level in each of the horizontal periods H1, H2, H3, and H4. For example, for the horizontal period H1, the first switching signal CLA is activated to a low level, and then, the second switching signal CLB is activated to a low level. In one embodiment, a period for which the first switching signal CLA is at a low level and a period for which the second switching signal CLB is at a low level do not overlap each other.

The demultiplexer 500 outputs the data signals from the output lines YL1, YL2, YL3, YL4, and YL5 to the data lines DL1, DL3, DL5, DL7, and DL9, respectively when the first switching signal CLA is at a low level.

The demultiplexer 500 outputs the data signals from the output lines YL1, YL2, YL3, and YL4 to the data lines DL2, DL4, DL6, and DL8, respectively when the second switching signal CLB is at a low level.

Therefore, only the data signal B1 corresponding to the first color light may be provided to the data line DL1. The data signal B1 of the data line DL1 may be provided to the first-row pixel circuit PC11.

Only the data signal R2 corresponding to the third color light may be provided to the data line DL2. The data signal R2 of the data line DL2 may be provided to the first-row pixel circuit PC12 and the second-row pixel circuit PC22.

As shown in FIG. 14, the pixel circuits PC11 and PC12 connected to the data lines DL1 and DL2 are connected to different scan lines GL1A and GL1B, respectively. Further, the pixel circuits PC21 and PC22 connected to the data lines DL1 and DL2 are connected to different scan lines GL1A and GL1B, respectively.

Therefore, a period GWT for which each of the scan signals GW1A, GW1B, GW2A, and GW2B is active may be maintained for a maximum duration in each of the horizontal periods H1, H2, H3, and H4. For example, the period GWT for which each of the scan signals GW1A, GW1B, GW2A, and GW2B is active may be larger than one half (i.e., 0.5H) of 1 horizontal period (1H) (GWT>0.5H).

In the example as shown in FIG. 15, the second transistor T2 is turned on in response to the scan signal GW1. When the second transistor T2 is turned on in a state in which the third transistor T3 has been turned on, the data signal B1 provided to the data line DL1 is stored in the capacitor Cst via the second transistor T2, the first transistor T1, and the third transistor T3. When a period for which the scan signal GW1 is low (that is, a low level period) becomes larger, a time duration for which the data signal B1 is stored in the capacitor Cst may be sufficient.

The period GWT for which each of the scan signals GW1A, GW1B, GW2A, and GW2B is active may be maintained for a maximum duration. Thus, the time duration for which the data signal is stored in the capacitor inside each pixel circuit may be sufficient.

The data driver circuit of the display device having the above configuration may output only one color data signal among the first to third color data signals to some of the output lines, and may alternately output the first color data signal and the second color data signal to the others of the output lines.

Only one color data signal among the first to third color data signals is output to some output lines, such that the power consumption of the display device may be reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display panel comprising:

a plurality of data lines which include first to fifth data lines;

11-th to 15-th pixel circuits respectively connected to the first to fifth data lines and arranged in a first row;

21-th to 25-th pixel circuits respectively connected to the first to fifth data lines and arranged in a second row;

11-th to 15-th light-emitting elements, respectively connected to corresponding one of the 11-th to 15-th pixel circuits; and 22-th to 24-th light-emitting elements respectively connected to corresponding one of the 22-th to 25-th pixel circuits, wherein the 13-th light-emitting element includes a 13-th anode and a 13-th connection line extending in a first oblique direction from the 13-th anode, wherein the 13-th light-emitting element is connected to the corresponding one of the 11-th to 15-th pixel circuits via the 13-th connection line, wherein the 23-th light-emitting element includes a 23-th anode and a 23-th connection line extending in a second oblique direction from the 23-th anode, wherein the 23-th light-emitting element is connected to the corresponding one of the 22-th to 25-th pixel circuits via the 23-th connection line, the pixel circuit connected to the 13-th light-emitting element among the 11-th to 15-th pixel circuits and the pixel circuit connected to the 21-th light-emitting element among the 22-th to 25-th pixel circuits are connected to the same data line among the first to fifth data lines, the pixel circuit connected to the 15-th light-emitting element among the 11-th to 15-th pixel circuits and the pixel circuit connected to the 23-th light-emitting element among the 22-th to 25-th pixel circuits are connected to the same data line among the first to fifth data lines, wherein the 13-th light-emitting element and the 23-th light-emitting element emit light of different colors, respectively, and wherein the 15-th light-emitting element and the 23-th light-emitting element emit light of the same color.

2. The display panel of claim 1, wherein the 11-th to 15-th light-emitting elements are sequentially arranged in a first direction, and wherein the 22-th to 24-th light-emitting elements are sequentially arranged in the first direction.

3. The display panel of claim 2, the 13-th light-emitting element and the 21-th light-emitting element are arranged in an oblique direction, and wherein the 15-th light-emitting element and the 23-th light-emitting element are arranged in an oblique direction.

4. The display panel of claim 2, wherein the 23-th light-emitting element overlaps the 23-th pixel circuit and the 24-th pixel circuit.

5. The display panel of claim 4, wherein the third data line and the fourth data line transmit a data signal corresponding to second color light and the fifth data line transmit a data signal corresponding to first color light differ from the second color light.

6. The display panel of claim 2, wherein each of the first to fifth data lines is disposed on one of a first side and a second side with respect to a center of the 11-th to 15-th pixel circuits, wherein each of the 11-th to 15-th light-emitting elements includes a contact disposed on an opposite side of the data line with respect to the center of the 11-th to 15-th pixel circuits, and wherein the contact of each of 11-th to 15-th light-emitting elements is connected to the corresponding one of the 11-th to 15-th pixel circuits.

7. The display panel of claim 1, wherein the 11-th light-emitting element includes an 11-th anode connected to the 11-th pixel circuit, wherein the 21-th light-emitting element includes a 22-th anode connected to the 22-th pixel circuit, wherein the 11-th light-emitting element and the 21-th light-emitting element emit light of different colors, respectively.

8. The display panel of claim 1, further comprising a demultiplexer configured to operate in response to a switching signal to alternately connect a first output line to the first data line and the second data line, configured to alternately connect a second output line to the third data line and the fourth data line, and configured to connect a third output line to the fifth data line.

9. The display panel of claim 8, wherein each of the 11-th light-emitting element and the 23-th light-emitting element emits first color light, wherein each of the 12-th light-emitting element, the 14-th light-emitting element, the 22-th light-emitting element, and the 24-th light-emitting element emits second color light, and wherein each of the 13-th light-emitting element and the 21-th light-emitting element emits third color light.

10. The display panel of claim 9, wherein the first output line alternately transmits a data signal corresponding to the first color light and a data signal corresponding to the third color light, wherein the second output line transmits a data signal corresponding to the second color light, and wherein the third output line transmits a data signal corresponding to the first color light.

11. The display panel of claim 10, wherein the first data line transmits the data signal corresponding to the first color light, wherein the second data line transmits the data signal corresponding to the third color light, wherein each of the third data line and the fourth data line transmits the data signal corresponding to the second color light, and wherein the fifth data line transmits the data signal corresponding to the first color light.

12. The display panel of claim 1, wherein the 13-th connection line overlaps the second data line and the third data line, and wherein the 23-th connection line overlaps the fourth data line and the fifth data line.

13. The display panel of claim 1, wherein 13-th connection line overlaps the fourth data line and the fifth data line, and wherein the 23-th connection line overlaps the second data line and the third data line.

14. The display panel of claim 1, wherein each of the 11-th light-emitting element, 15-th light-emitting elements, and the 23-th light-emitting element emits blue color light, wherein each of the 12-th light-emitting element, the 14-th light-emitting element, the 22-th light-emitting element, and the 24-th light-emitting element emits green color light, and wherein each of the 13-th light-emitting element and the 21-th light-emitting element emits red color light.

15. The display panel of claim 1, wherein each of the 11-th light-emitting element, the 15-th light-emitting elements, and the 23-th light-emitting element emits red color light, wherein each of the 12-th light-emitting element, the 14-th light-emitting element, the 22-th light-emitting element, and the 24-th light-emitting element emits green color light, and wherein each of the 13-th light-emitting element and the 21-th light-emitting element emits blue color light.

16. The display panel of claim 1, further comprising a demultiplexer including a first switch and a second switch, the demultiplexer being configured to:

operate in response to a first switching signal applied to the first switch to connect first, second, and third output lines to the first, third, and fifth data lines, respectively; and operate in response to a second switching signal applied to the second switch to connect the first and second output lines to the second and fourth data lines, respectively, wherein, during a first frame, the first switching signal transitions to an active level before the second switching signal transitions to an active level, and wherein, during a second frame subsequent to the first frame, the second switching signal transitions to an active level before the first switching signal transitions to an active level.

17. An electronic device comprising:

a display panel; and a data driver circuit output data signals to the display panel, wherein the display panel includes:

a plurality of data lines which include first to fifth data lines receive the data signals;

11-th to 15-th pixel circuits respectively connected to the first to fifth data lines and arranged in a first row;

21-th to 25-th pixel circuits respectively connected to the first to fifth data lines and arranged in a second row;

11-th to 15-th light-emitting elements, respectively connected to corresponding one of the 11-th to 15-th pixel circuits; and 22-th to 24-th light-emitting elements respectively connected to corresponding one of the 22-th to 25-th pixel circuits, wherein the 13-th light-emitting element includes a 13-th anode and a 13-th connection line extending in a first oblique direction from the 13-th anode, wherein the 13-th light-emitting element is connected to the corresponding one of the 11-th to 15-th pixel circuits via the 13-th connection line, wherein the 23-th light-emitting element includes a 23-th anode and a 23-th connection line extending in a second oblique direction from the 23-th anode, wherein the 23-th light-emitting element is connected to the corresponding one of the 22-th to 25-th pixel circuits via the 23-th connection line, the pixel circuit connected to the 13-th light-emitting element among the 11-th to 15-th pixel circuits and the pixel circuit connected to the 23-th light-emitting element among the 22-th to 25-th pixel circuits are connected to the same data line among the first to fifth data lines, the pixel circuit connected to the 15-th light-emitting element among the 11-th to 15-th pixel circuits and the pixel circuit connected to the 21-th light-emitting element among the 22-th to 25-th pixel circuits are connected to the same data line among the first to fifth data lines, wherein the 13-th light-emitting element and the 23-th light-emitting element emit light of different colors, respectively, and wherein the 15-th light-emitting element and the 23-th light-emitting element emit light of the same color.

18. The electronic device of claim 17, wherein the 11-th to 15-th light-emitting elements are sequentially arranged in a first direction, and wherein the 22-th to 24-th light-emitting elements are sequentially arranged in the first direction.

19. The electronic device of claim 18, wherein the 13-th light-emitting element and the 21-th light-emitting element are arranged in an oblique direction, wherein the 15-th light-emitting element and the 23-th light-emitting element are arranged in oblique direction, wherein the 13-th light-emitting element overlaps the 13-th pixel circuit and the 14-th pixel circuit, and wherein the 23-th light-emitting element overlaps the 23-th pixel circuit and the 24-th pixel circuit.

* * * * *